(12) United States Patent
Miyamoto et al.

(10) Patent No.: US 9,840,827 B2
(45) Date of Patent: Dec. 12, 2017

(54) WORK VEHICLE AND METHOD OF CONTROLLING WORK VEHICLE

(71) Applicant: KOMATSU LTD., Tokyo (JP)

(72) Inventors: Shunsuke Miyamoto, Atsugi (JP); Hiroshi Monden, Hiratsuka (JP); Yasunori Ohkura, Kawasaki (JP); Masao Yoshizawa, Kawasaki (JP); Yasuki Kishimoto, Fujisawa (JP)

(73) Assignee: KOMATSU LTD., Tokyo (JP)

( * ) Notice: Subject to any disclaimer, the term of this patent is extended or adjusted under 35 U.S.C. 154(b) by 338 days.

(21) Appl. No.: 14/759,122

(22) PCT Filed: Sep. 9, 2014

(86) PCT No.: PCT/JP2014/073763
§ 371 (c)(1),
(2) Date: Jul. 2, 2015

(87) PCT Pub. No.: WO2015/056500
PCT Pub. Date: Apr. 23, 2015

(65) Prior Publication Data
US 2016/0298315 A1    Oct. 13, 2016

(30) Foreign Application Priority Data

Oct. 18, 2013  (JP) ................................. 2013-217411

(51) Int. Cl.
*E02F 9/20* (2006.01)
*B60K 6/36* (2007.10)
(Continued)

(52) U.S. Cl.
CPC .............. *E02F 9/2079* (2013.01); *B60K 6/36* (2013.01); *B60K 6/365* (2013.01); *B60K 6/445* (2013.01);
(Continued)

(58) Field of Classification Search
None
See application file for complete search history.

(56) References Cited

U.S. PATENT DOCUMENTS 5,884,201 A    3/1999  Kawai
7,267,634 B2 * 9/2007  Nakagawa ............ B60W 10/02
                                                            477/172

(Continued)

FOREIGN PATENT DOCUMENTS

CN    102803686 A    11/2012
EP    0 745 503 A1   12/1996
(Continued)

OTHER PUBLICATIONS

The Office Action for the corresponding Chinese application No. 201480004254.9, dated Sep. 9, 2016.
(Continued)

*Primary Examiner* — Dirk Wright
(74) *Attorney, Agent, or Firm* — Global IP Counselors, LLP

(57) ABSTRACT

A control unit embedded in a work vehicle includes a clutch controlling unit and a motor controlling unit. The clutch controlling unit is configured to disengage a first clutch in a condition that the first clutch is engaged and a second clutch is disengaged, when a first moving direction inputted through a forward/rearward movement switch operating device as an instruction of the operator and a second moving direction determined based on a vehicle speed detected by a vehicle speed detecting unit are different from each other, and in addition, when and the vehicle speed falls in a preliminarily set first range. The motor controlling unit is configured to control a motor to reduce a relative rotational speed of the second clutch after the first clutch is disengaged.

16 Claims, 17 Drawing Sheets

(51) Int. Cl.
- *B60K 6/445* (2007.10)
- *B60L 11/14* (2006.01)
- *B60W 10/08* (2006.01)
- *B60W 10/10* (2012.01)
- *B60W 20/00* (2016.01)
- *F16H 61/02* (2006.01)
- *F16H 61/688* (2006.01)
- *F16H 3/66* (2006.01)
- *F16H 3/72* (2006.01)
- *B60L 11/00* (2006.01)
- *B60L 11/12* (2006.01)
- *B60L 15/20* (2006.01)
- *B60K 6/365* (2007.10)
- *E02F 9/02* (2006.01)
- *E02F 9/22* (2006.01)
- *F16H 3/44* (2006.01)
- *F16H 37/10* (2006.01)
- *E02F 3/34* (2006.01)

(52) U.S. Cl.
CPC ........... *B60L 11/005* (2013.01); *B60L 11/123* (2013.01); *B60L 11/14* (2013.01); *B60L 15/20* (2013.01); *B60W 10/08* (2013.01); *B60W 10/10* (2013.01); *B60W 20/00* (2013.01); *E02F 9/02* (2013.01); *E02F 9/202* (2013.01); *E02F 9/2075* (2013.01); *E02F 9/22* (2013.01); *E02F 9/2296* (2013.01); *F16H 3/44* (2013.01); *F16H 3/66* (2013.01); *F16H 3/72* (2013.01); *F16H 3/728* (2013.01); *F16H 61/02* (2013.01); *F16H 61/688* (2013.01); *B60L 2210/40* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2250/24* (2013.01); *B60L 2250/26* (2013.01); *E02F 3/34* (2013.01); *F16H 2037/104* (2013.01); *F16H 2200/2007* (2013.01); *F16H 2200/2035* (2013.01); *Y02T 10/6217* (2013.01); *Y02T 10/645* (2013.01); *Y02T 10/7022* (2013.01); *Y02T 10/7077* (2013.01); *Y02T 10/7241* (2013.01); *Y02T 10/7275* (2013.01)

(56) References Cited

U.S. PATENT DOCUMENTS

| | | | | |
|---|---|---|---|---|
| 8,858,392 | B2* | 10/2014 | Dix | F16H 61/438 477/68 |
| 9,341,200 | B2* | 5/2016 | Miyamoto | B60K 6/445 |
| 2005/0227810 | A1 | 10/2005 | Nakagawa et al. | |
| 2008/0105478 | A1 | 5/2008 | Bishop | |
| 2011/0028269 | A1 | 2/2011 | Park | |
| 2011/0046858 | A1 | 2/2011 | Takahashi et al. | |
| 2012/0310493 | A1 | 12/2012 | Fukuhara et al. | |
| 2012/0310495 | A1 | 12/2012 | Nakanishi et al. | |
| 2015/0315767 | A1* | 11/2015 | Miyamoto | E02F 3/283 701/50 |

FOREIGN PATENT DOCUMENTS

| | | |
|---|---|---|
| EP | 2 202 429 A1 | 6/2010 |
| EP | 2 538 121 A1 | 12/2012 |
| JP | 7-7815 A | 1/1995 |
| JP | 2004-161053 A | 6/2004 |
| JP | 2006-329244 A | 7/2006 |
| JP | 2007-269072 A | 10/2007 |
| JP | 2008-201181 A | 9/2008 |
| JP | 2009-51366 A | 3/2009 |
| WO | 2006/067477 A1 | 6/2006 |

OTHER PUBLICATIONS

The extended European search report for the corresponding European application No. 14854776.3, dated Sep. 12, 2016.
The International Search Report for the corresponding international application No. PCT/JP2014/073763, dated Dec. 9, 2014.
The Office Action for the corresponding European application No. 14 854 7763 dated Aug. 3, 2017.

* cited by examiner

WORK VEHICLE AND METHOD OF CONTROLLING WORK VEHICLE

CROSS-REFERENCE TO RELATED APPLICATIONS

This application is a U.S. National stage application of International Application No. PCT/JP2014/073763, filed on Sep. 9, 2014. This U.S. National stage application claims priority under 35 U.S.C. §119(a) to Japanese Patent Application No. 2013-217411, filed in Japan on Oct. 18, 2013, the entire contents of which are hereby incorporated herein by reference.

BACKGROUND

Field of the Invention

The present invention relates to a work vehicle and a method of controlling the work vehicle.

Background Information

Among work vehicles, such as a wheel loader, a type of work vehicles equipped with a power transmission including a torque converter and a multistage gearbox (hereinafter referred to as "a torque converter type transmission") has been widely known. On the other hand, in recent years, HMTs (hydro-mechanical transmissions) and EMTs (electro-mechanical transmissions) have been known as power transmissions that supersede the torque converter type transmissions.

As disclosed in Japan Laid-open Patent Application Publication No. 2006-329244, the HMTs include a gear mechanism and a motor connected to a rotary element of the gear mechanism. The HMTs are configured to convert part of a driving force from an engine into a hydraulic pressure and transmit the hydraulic pressure to a travelling apparatus, and is also configured to mechanically transmit the remainder of the driving force to the travelling apparatus.

To enable continuously variable speed change, the HMTs include, for instance, a planetary gear mechanism and a hydraulic motor. Among three elements composed of a sun gear, a carrier and a ring gear in the planetary gear mechanism, a first element is coupled to an input shaft, and a second element is coupled to an output shaft. Additionally, a third element is coupled to a hydraulic motor. The hydraulic motor is configured to function as either a motor or a pump in accordance with a travelling condition of the work vehicle. The HMTs are configured to be capable of continuously variably changing the rotational speed of the output shaft by changing the rotational speed of the hydraulic motor.

On the other hand, the EMTs use an electric motor instead of the hydraulic motor used in the HMTs. The electric motor is configured to function as either a motor or an electric generator in accordance with a travelling condition of the work vehicle. Similarly to the HMTs, the EMTs are configured to be capable of continuously variably changing a rotational speed ratio of the output shaft to the input shaft by changing the rotational speed of the electric motor.

Work vehicles could encounter a situation that during travelling in either the forward direction or the rearward direction, an operator performs an operation of switching the present travelling direction to its opposite direction. When such an operation is performed, work vehicles equipped with a conventional torque converter type transmission quickly decelerate and then accelerate in the opposite direction. Such an operator operation is referred to as a shuttle operation, and a vehicle motion caused by the shuttle operation is referred to as a shuttle motion.

In the work vehicles equipped with the conventional torque converter type transmission, the torque converter absorbs a braking force generated between a clutch input shaft and a clutch output shaft in a forward moving clutch or a rearward moving clutch due to the shuttle motion. However, the work vehicle equipped with a power transmission of an HMT or EMT type, which is described in Japan Laid-open Patent Application Publication No. 2006-329244, has no torque converter. Therefore, in the work vehicle, a braking force generated in deceleration is supposed to be mainly absorbed by the engine. Accordingly, when the clutch is disengaged in the work vehicle, the braking force cannot be returned to the engine. Hence, the work vehicle cannot be braked like the work vehicles equipped with the conventional torque converter type transmission.

The present invention aims to provide a work vehicle and a method of controlling the work vehicle whereby a braking performance equivalent to that of a conventional torque converter type work vehicle can be exerted when an operator switches between forward movement and rearward movement in a power transmission of an HMT or EMT type.

A work vehicle according to a first aspect of the present invention includes an engine, a hydraulic pump configured to be driven by the engine, a work implement configured to be driven by an hydraulic oil discharged from the hydraulic pump, a travelling apparatus configured to be driven by the engine, a power transmission configured to transmit a driving force transmitted thereto from the engine to the travelling apparatus, a control unit configured to control the power transmission, a forward/rearward movement switch operating device into which an instruction regarding either forward movement or rearward movement is inputted by an operator, and a vehicle speed detecting unit configured to detect a vehicle speed of the travelling apparatus. The power transmission includes an input shaft, an output shaft, a gear mechanism that has a planetary gear mechanism and is configured to transmit a rotation of the input shaft to the output shaft, a motor connected to a rotary element of the planetary gear mechanism, a first clutch for connecting with the gear mechanism to drive the travelling apparatus in one of a forward moving direction and a rearward moving direction, a second clutch for connecting with the gear mechanism to drive the travelling apparatus in an opposite direction to the one direction, and a second clutch relative rotational speed detecting unit configured to detect a relative rotational speed between a clutch input shaft and a clutch output shaft in the second clutch. The power transmission is configured to change a rotational speed ratio of the output shaft to the input shaft by changing a rotational speed of the motor. The control unit includes a clutch controlling unit and a motor controlling unit. The clutch controlling unit is configured to disengage the first clutch in a condition that the first clutch is engaged and the second clutch is disengaged, when a first moving direction inputted through the forward/rearward switch operating device, the first moving direction directed by the operator and a second moving direction determined based on the vehicle speed detected by the vehicle speed detecting unit are different from each other, and in addition, when the vehicle speed falls in a preliminarily set first range. The motor controlling unit is configured to control the motor to reduce the relative rotational speed of the second clutch after the first clutch is disengaged.

The clutch controlling unit may be configured to change a clutch pressure of the second clutch into a predetermined second pressure, which is lower than a first pressure at which the second clutch is engaged, when the vehicle speed falls in the first range.

The clutch controlling unit may be configured to increase the clutch pressure of the second clutch from the second pressure when the relative rotational speed of the second clutch falls in a preliminarily set second range.

The power transmission may further include a motor rotational speed detecting unit configured to detect a rotational speed of the motor. The clutch controlling unit may be configured to change the clutch pressure of the second clutch into a third pressure, which is higher than the second pressure and is lower than the first pressure, when the rotational speed of the motor falls in a preliminarily set third range.

The clutch controlling unit may be configured to change the clutch pressure of the second clutch into the third pressure when the relative rotational speed of the second clutch falls in a preliminarily set fourth range.

The work vehicle may further include an accelerator operating member and an accelerator operation detecting unit configured to detect an operating amount of the accelerator operating member. Furthermore, the clutch controlling unit may be configured to change the clutch pressure of the second clutch into the third pressure when the operating amount of the accelerator operating member falls in a preliminarily set fifth range.

The motor controlling unit may be configured to control a torque of the motor by setting a torque limit that is an absolute value of a maximum torque allowed to be outputted from the motor. Furthermore, the motor controlling unit may be configured to increase the torque limit from a predetermined initial value to a predetermined maximum value.

The motor controlling unit may be configured to increase the torque limit from the aforementioned initial value to the aforementioned maximum value until the relative rotational speed of the second clutch falls in a preliminarily set sixth range. Furthermore, the motor controlling unit may be configured to reduce the torque limit to a predetermined first target value when the relative rotational speed of the second clutch falls in the sixth range. It should be noted that the sixth range may be within the second range.

The motor controlling unit may be configured to control the torque of the motor to be zero when the relative rotational speed of the second clutch falls in a preliminarily set seventh range.

Where the vehicle speed of the work vehicle moving in the second moving direction is defined as positive, the first range may be a range in which the vehicle speed becomes a predetermined value or less. Specifically, the expression "within the first range" may refer to a range in which the vehicle speed becomes around 0.

A method of controlling a work vehicle according to a second aspect of the present invention is a method of controlling a work vehicle to be hereinafter described. The work vehicle includes an engine, a hydraulic pump configured to be driven by the engine, a work implement configured to be driven by an hydraulic oil discharged from the hydraulic pump, a travelling apparatus configured to be driven by the engine, a power transmission configured to transmit a driving force transmitted thereto from the engine to the travelling apparatus, and a forward/rearward movement switch operating device into which an instruction regarding either forward movement or rearward movement is inputted by an operator. The power transmission includes an input shaft, an output shaft, a gear mechanism that has a planetary gear mechanism and is configured to transmit a rotation of the input shaft to the output shaft, a motor connected to a rotary element of the planetary gear mechanism, a first clutch for connecting with the gear mechanism to drive the travelling apparatus in one of a forward moving direction and a rearward moving direction, and a second clutch for connecting with the gear mechanism to drive the travelling apparatus in an opposite direction to the one direction. The power transmission is configured to change a rotational speed ratio of the output shaft to the input shaft by changing a rotational speed of the motor. The present controlling method includes the steps of: disengaging the first clutch in a condition that the first clutch is engaged and the second clutch is disengaged, when a first moving direction inputted through the forward/rearward switch operating device, the first moving direction directed by the operator and a second moving direction determined based on a vehicle speed of the travelling apparatus are different from each other, and in addition, when the vehicle speed falls in a preliminarily set first range; and controlling the motor to reduce a relative rotational speed between a clutch input shaft and a clutch output shaft in the second clutch after the first clutch is disengaged.

According to the present invention, it is possible to provide a work vehicle and a method of controlling the work vehicle, whereby when an operator switches between forward movement and rearward movement in a power transmission of an HMT or EMT type, over-rotation of the gear mechanism and that of the motor in the power transmission is prevented, vibration of the vehicle body attributed to variation in rotation to be caused in either clutch engagement or clutch disengagement is alleviated, and engine load and clutch abrasion is reduced.

DETAILED DESCRIPTION OF EXEMPLARY EMBODIMENTS

Figure 1:
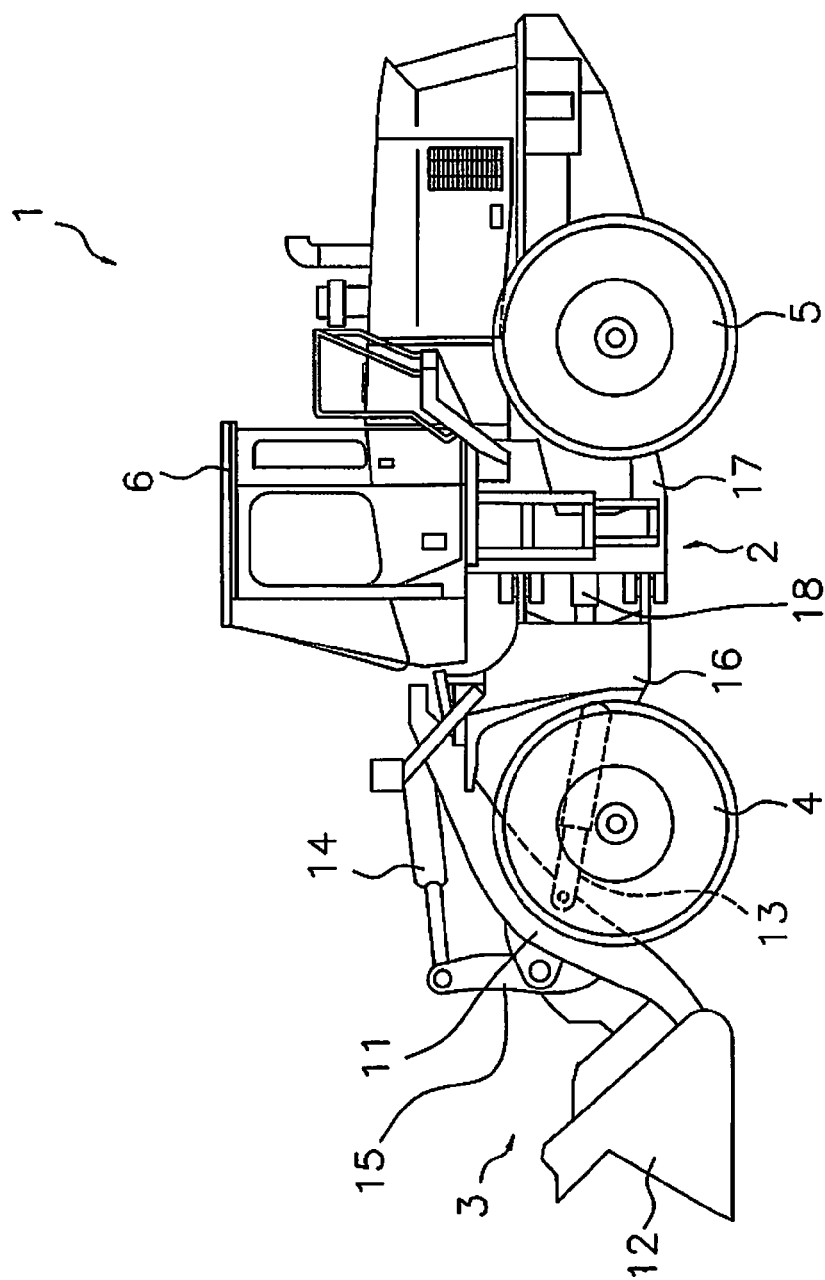
FIG. 1 is a side view of a work vehicle according to an exemplary embodiment.

An exemplary embodiment of the present invention will be hereinafter explained with reference to drawings. FIG. 1 is a side view of a work vehicle 1 according to the exemplary embodiment of the present invention. As shown in FIG. 1, the work vehicle 1 includes a vehicle body frame 2, a work implement 3, travelling wheels 4 and 5, and a cab 6. The work vehicle 1 is a wheel loader and is configured to travel when the travelling wheels 4 and 5 are driven and rotated. The work vehicle 1 is capable of performing works, such as digging, with use of the work implement 3.

The work implement 3 and the travelling wheels 4 and 5 are attached to the vehicle body frame 2. The work implement 3 is driven by hydraulic oil from a work implement pump 23 to be described (see FIG. 2). The work implement 3 includes a boom 11 and a bucket 12. The boom 11 is mounted to the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. When the lift cylinder 13 is extended and contracted by the hydraulic oil from the work implement pump 23, the boom 11 is configured to pivot up and down. The bucket 12 is attached to the tip end of the boom 11. One end of the bucket cylinder 14 is attached to the vehicle body frame 2. The other end of the bucket cylinder 14 is attached to the bucket 12 through a bellcrank 15. When the bucket cylinder 14 is extended and contracted by the hydraulic oil from the work implement pump 23, the bucket 12 is configured to pivot up and down.

The cab 6 and the travelling wheels 5 are attached to the vehicle body frame 2. The cab 6 is mounted onto the vehicle body frame 2. A seat on which an operator is seated, an operating device to be described and so forth are disposed within the cab 6. The vehicle body frame 2 includes a front frame 16 and a rear frame 17. The front frame 16 and the rear frame 17 are attached to each other to be capable of pivoting in the right-and-left direction.

The work vehicle 1 includes a steering cylinder 18. The steering cylinder 18 is attached to the front frame 16 and the rear frame 17. The steering cylinder 18 is a hydraulic cylinder. When the steering cylinder 18 is extended and contracted by the hydraulic oil from a steering pump 28 to be described, the moving direction of the work vehicle 1 is configured to be changed right and left.

Figure 2:
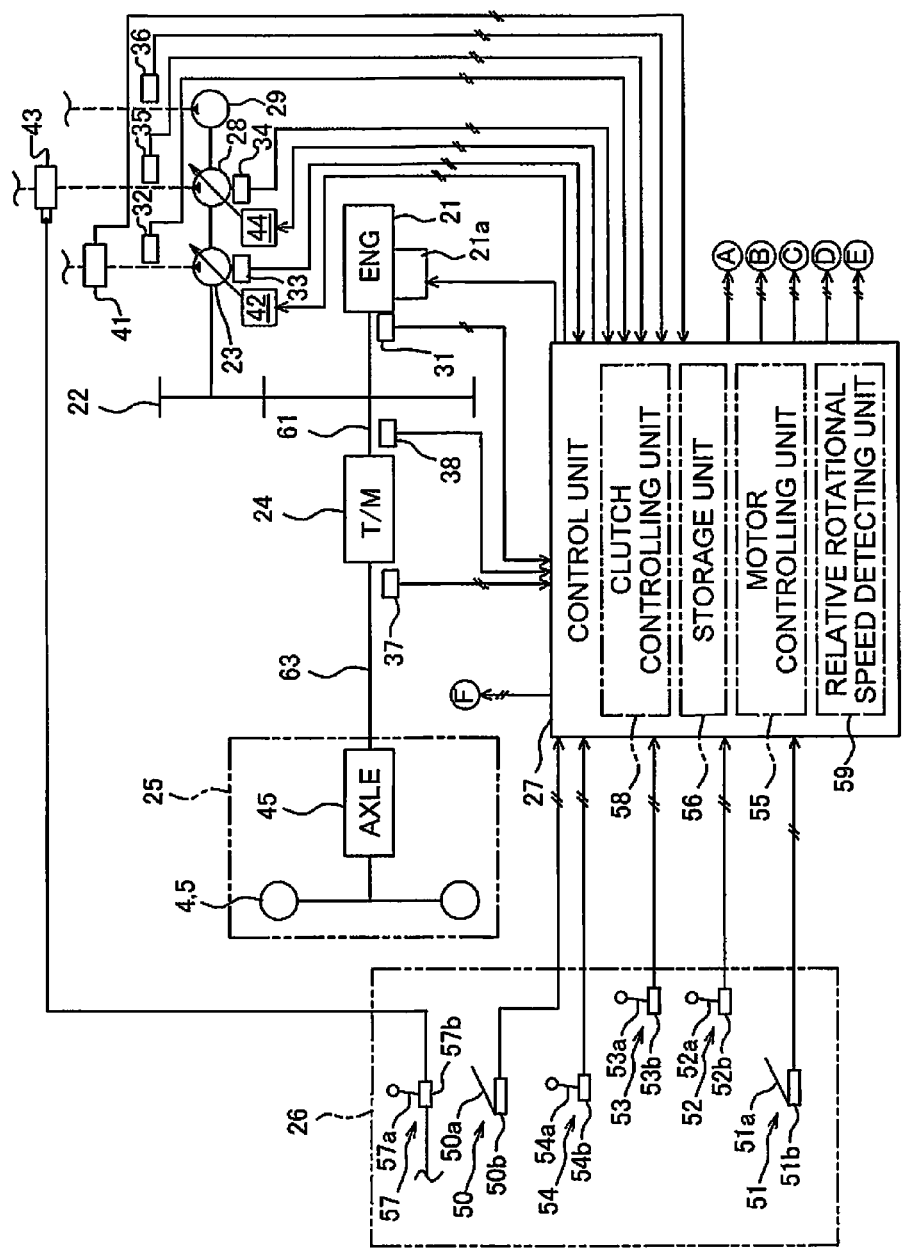
FIG. 2 is a schematic diagram showing a construction of the work vehicle.

FIG. 2 is a schematic diagram of a construction of the work vehicle 1. As shown in FIG. 2, the work vehicle 1 includes an engine 21, a power take-off (PTO) 22, a power transmission 24, a travelling apparatus 25, an operating device 26, a control unit 27 and so forth.

The engine 21 is, for instance, a diesel engine. The output of the engine 21 is controlled by regulating the amount of fuel to be injected into the cylinder of the engine 21. The amount of fuel is regulated through the control of a fuel injection device 21a attached to the engine 21 by the control unit 27. The work vehicle 1 includes an engine rotational speed detecting unit 31. The engine rotational speed detecting unit 31 is configured to detect an engine rotational speed and transmit a detection signal indicating the engine rotational speed to the control unit 27.

The work vehicle 1 may include the work implement pump 23, the steering pump 28 and a transmission pump 29. The work implement pump 23, the steering pump 28 and the transmission pump 29 are hydraulic pumps. The PTO 22 is configured to transmit part of a driving force from the engine 21 to these hydraulic pumps 23, 28 and 29. In other words, the PTO 22 is configured to distribute the driving force from the engine 21 to these hydraulic pumps 23, 28 and 29 and the power transmission 24.

The work implement pump 23 is driven by the driving force from the engine 21. The hydraulic oil discharged from the work implement pump 23 is supplied to the aforementioned lift cylinder 13 and bucket cylinder 14 through a work implement control valve 41. The work vehicle 1 includes a work implement pump pressure detecting unit 32. The work implement pump pressure detecting unit 32 is configured to detect the discharge pressure of the hydraulic oil from the work implement pump 23 (hereinafter referred to as "a work implement pump pressure") and transmit a detection signal indicating the work implement pump pressure to the control unit 27.

The work implement pump 23 is a variable displacement hydraulic pump. The discharge volume of the work implement pump 23 is changed by changing the tilt angle of either a swashplate or a tilting shaft of the work implement pump 23. A first displacement control device 42 is connected to the work implement pump 23. The first displacement control device 42 is controlled by the control unit 27 and is configured to change the tilt angle of the work implement pump 23. Accordingly, the discharge volume of the work implement pump 23 is controlled by the control unit 27. For example, the first displacement control device 42 is configured to regulate the tilt angle of the work implement pump 23 such that a pressure differential between the both sides of the work implement control valve 41 can be constant. Additionally, the first displacement control device 42 is capable of arbitrarily changing the tilt angle of the work implement pump 23 in response to a command signal from the control unit 27. When described in detail, the first displacement control device 42 includes a first valve and a second valve, both of which are not shown in the drawings. When the hydraulic oil to be supplied to the work implement 3 is changed by the aforementioned work implement control valve 41, a pressure differential is generated between the discharge pressure of the work implement pump 23 and the pressure on the outlet side of the work implement control valve 41 in accordance with change in opening degree of the work implement control valve 41. When controlled by the control unit 27, the first valve is configured to regulate the tilt angle of the work implement pump 23 such that the pressure differential between the both sides of the work implement control valve 41 can be constant even when the load of the work implement 3 varies. On the other hand, when controlled by the control unit 27, the second valve is capable of further changing the tilt angle of the work implement pump 23. The work vehicle 1 includes a first tilt angle detecting unit 33. The first tilt angle detecting unit 33 is configured to detect the tilt angle of the work implement pump 23 and transmit a detection signal indicating the tilt angle to the control unit 27.

The steering pump 28 is driven by the driving force form the engine 21. The hydraulic oil discharged from the steering pump 28 is supplied to the aforementioned steering cylinder 18 through a steering control valve 43. The work vehicle 1 includes a steering pump pressure detecting unit 35. The steering pump pressure detecting unit 35 is configured to detect the discharge pressure of the hydraulic oil from the steering pump 28 (hereinafter referred to as "a steering pump pressure") and transmit a detection signal indicating the steering pump pressure to the control unit 27.

The steering pump 28 is a variable displacement hydraulic pump. The discharge volume of the steering pump 28 is changed by changing the tilt angle of either a swashplate or a tilting shaft of the steering pump 28. A second displacement control device 44 is connected to the steering pump 28. The second displacement control device 44 is controlled by the control unit 27 and is configured to change the tilt angle of the steering pump 28. Accordingly, the discharge volume of the steering pump 28 is controlled by the control unit 27. The work vehicle 1 includes a second tilt angle detecting unit 34. The second tilt angle detecting unit 34 is configured to detect the tilt angle of the steering pump 28 and transmit a detection signal indicating the tilt angle to the control unit 27.

The transmission pump 29 is driven by the driving force from the engine 21. The transmission pump 29 is a fixed displacement hydraulic pump. The hydraulic oil discharged from the transmission pump 29 is supplied to clutches CF, CR, CL and CH of the power transmission 24 through clutch control valves VF, VR, VL and VH to be described. A transmission pump pressure detecting unit 36 is configured to detect the discharge pressure of the hydraulic oil from the transmission pump 29 (hereinafter referred to as "a transmission pump pressure") and transmit a detection signal indicating the transmission pump pressure to the control unit 27.

The PTO 22 is configured to transmit part of the driving force from the engine 21 to the power transmission 24. The power transmission 24 is configured to transmit the driving force from the engine 21 to the travelling apparatus 25. The power transmission 24 is configured to change the speed of the driving force from the engine 21 and output the speed-changed driving force. The construction of the power transmission 24 will be explained below in detail.

The travelling apparatus 25 includes an axle 45 and the travelling wheels 4 and 5. The travelling apparatus 25 is driven by the engine 21. The axle 45 is configured to transmit the driving force from the power transmission 24 to the travelling wheels 4 and 5. The travelling wheels 4 and 5 are thereby rotated. The work vehicle 1 includes an output rotational speed detecting unit 37 and an input rotational speed detecting unit 38. The output rotational speed detecting unit 37 is configured to detect the rotational speed of an output shaft 63 of the power transmission 24 (hereinafter referred to as "an output rotational speed"). The output rotational speed corresponds to the vehicle speed. Hence, the output rotational speed detecting unit 37 is configured to detect the vehicle speed of the travelling apparatus 25 by detecting the output rotational speed. The input rotational speed detecting unit 38 is configured to detect the rotational speed of an input shaft 61 of the power transmission 24 (hereinafter referred to as "an input rotational speed"). The output rotational speed detecting unit 37 is configured to transmit a detection signal indicating the output rotational speed to the control unit 27. The input rotational speed detecting unit 38 is configured to transmit a detection signal indicating the input rotational speed to the control unit 27.

It should be noted that instead of the output rotational speed detecting unit 37 and the input rotational speed detecting unit 38, another rotational speed detecting unit may be provided for detecting the rotational speed of a rotary component inside the power transmission 24 and transmit the detected rotational speed to the control unit 27, and the control unit 27 may be configured to calculate the input rotational speed and the output rotational speed on the basis of the rotational speed of the rotary component.

The operating device 26 is operated by the operator. The operating device 26 includes an accelerator operating device 51, a work implement operating device 52, a forward/rearward movement switch operating device 54 and a steering operating device 57. It should be noted that the operating device 26 may further include a gearshift operating device 53.

The accelerator operating device 51 includes an accelerator operating member 51a and an accelerator operation detecting unit 51b. The accelerator operating member 51a is operated for setting a target rotational speed of the engine 21. The accelerator operation detecting unit 51b is configured to detect the operating amount of the accelerator operating device 51 (hereinafter refereed to as "an accelerator operating amount"). The accelerator operation detecting unit 51b is configured to transmit a detection signal indicating the accelerator operating amount to the control unit 27.

The work implement operating device 52 includes a work implement operating member 52a and a work implement operation detecting unit 52b. The work implement operating member 52a is operated for activating the work implement 3. The work implement operation detecting unit 52b is configured to detect the position of the work implement operating member 52a. The work implement operation detecting unit 52b is configured to output a detection signal indicating the position of the work implement operating member 52a to the control unit 27.

The gearshift operating device 53 includes a gearshift operating member 53a and a gearshift operation detecting unit 53b. The operator is capable of selecting a gearshift pattern of the power transmission 24 by operating the gearshift operating member 53a. The gearshift operation detecting unit 53b is configured to detect the position of the gearshift operating member 53a. The gearshift operation detecting unit 53b is configured to output a detection signal indicating the position of the gearshift operating member 53a to the control unit 27.

The forward/rearward movement switch operating device 54 includes a forward/rearward movement switch operating member 54a and a forward/rearward movement switch operation detecting unit 54b. In the following explanation, the forward/rearward movement switch operating device 54 will be referred to as an FR operating device 54, the forward/rearward switch operating member 54a will be referred to as an FR operating member 54a, and the forward/rearward switch operation detecting unit 54b will be referred to as an FR operation detecting unit 54b. An instruction of either forward movement or rearward movement is inputted into the FR operating device 54 by the operator. The operator is capable of switching between forward movement and rearward movement of the work vehicle 1 by operating the FR operating member 54a. The FR operation detecting unit 54*b* is configured to detect the position of the FR operating member 54*a*. The FR operation detecting unit 54*b* is configured to output a detection signal indicating the position of the FR operating member 54*a* to the control unit 27.

The steering operating device 57 includes a steering operating member 57*a*. The steering operating device 57 is configured to drive the steering control valve 43 by supplying a pilot hydraulic pressure to the steering control valve 43 in response to an operation of the steering operating member 57*a*. The operator is capable of changing the moving direction of the work vehicle 1 right and left by operating the steering operating member 57*a*. It should be noted that the steering operating device 57 may be configured to drive the steering control valve 43 by converting the operation of the steering operating member 57*a* into an electric signal.

A brake operating device 50 includes a brake operating member 50*a* and a brake operation detecting unit 50*b*. The operator causes the work vehicle 1 to generate a braking force by activating a brake device (not shown in the drawing) through the operation of the brake operating member 50*a*. The brake operation detecting unit 50*b* is configured to detect the position of the brake operating member 50*a*. The brake operation detecting unit 50*b* is configured to output a detection signal indicating the position of the brake operating member 50*a* to the control unit 27.

The control unit 27 includes an arithmetic logic unit, such as a CPU, and memories, such as a RAM and a ROM, and is configured to perform a variety of processing for controlling the work vehicle 1. Additionally, the control unit 27 includes a storage unit 56. The storage unit 56 stores a variety of programs and data for controlling the work vehicle 1.

The control unit 27 is configured to transmit a command signal indicating a command throttle value to the fuel injection device 21*a* such that the target rotational speed of the engine 21 can be achieved in accordance with the accelerator operating amount. The control unit 27 is configured to control the hydraulic pressures to be supplied to the hydraulic cylinders 13 and 14 by controlling the work implement control valve 41 on the basis of the detection signal from the work implement operation detecting unit 52*b*. Accordingly, the hydraulic cylinders 13 and 14 are extended and contracted, and the work implement 3 is activated. The control unit 27 is configured to control the hydraulic pressure to be supplied to the steering cylinder 18 by controlling the steering control valve 43 on the basis of a detection signal from a steering operation detecting unit 57*b*. Accordingly, the steering cylinder 18 is extended and contracted, and the moving direction of the work vehicle 1 is changed.

Additionally, the control unit 27 includes a motor controlling unit 55 and a clutch controlling unit 58, both of which serve to control the power transmission 24, and a relative rotational speed detecting unit 59 configured to detect the relative rotational speed of the clutch. The detailed construction of the control unit 27 and the control of the power transmission 24 will be explained below in detail.

Figure 3:
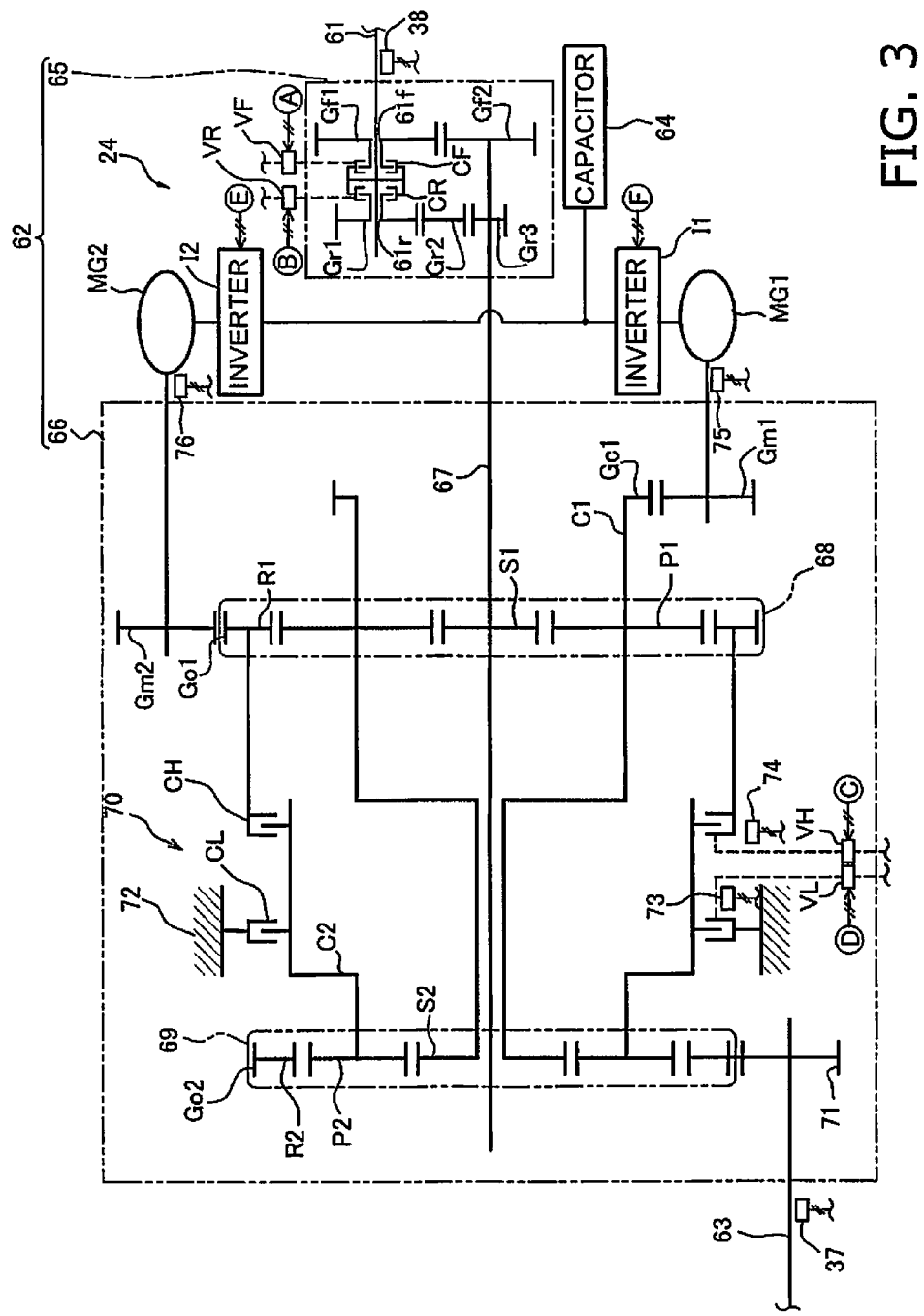
FIG. 3 is a schematic diagram showing a construction of a power transmission.

Next, the construction of the power transmission 24 will be explained in detail. FIG. 3 is a schematic diagram showing the construction of the power transmission 24. As shown in FIG. 3, the power transmission 24 includes the input shaft 61, a gear mechanism 62, the output shaft 63, a first motor MG1, a second motor MG2 and a capacitor 64. The input shaft 61 is connected to the aforementioned PTO 22. Rotation from the engine 21 is inputted into the input shaft 61 through the PTO 22. The gear mechanism 62 is configured to transmit the rotation of the input shaft 61 to the output shaft 63. The output shaft 63 is connected to the aforementioned travelling apparatus 25, and is configured to transmit the rotation from the gear mechanism 62 to the aforementioned travelling apparatus 25.

The gear mechanism 62 is a mechanism configured to transmit a driving force from the engine 21. The gear mechanism 62 is configured to change the speed ratio of the output shaft 63 to the input shaft 61 in accordance with variation in rotational speed of the motors MG1 and MG2. The gear mechanism 62 includes an FR switch mechanism 65 and a gearshift mechanism 66.

The FR switch mechanism 65 includes the forward movement clutch CF, the rearward movement clutch CR, a first F clutch gear Gf1, a second F clutch gear Gf2, a first R clutch gear Gr1, a second R clutch gear Gr2 and a third R clutch gear Gr3. The forward movement clutch CF is configured to connect or disconnect the first F clutch gear Gf1 and the input shaft 61. The rearward movement clutch CR is configured to connect or disconnect the first R clutch gear Gr1 and the input shaft 61. The second F clutch gear Gf2 is coupled to a transmission shaft 67 and is meshed with the first F clutch gear Gf1. The third R clutch gear Gr3 is coupled to the transmission shaft 67 and is meshed with the second R clutch gear Gr2. The second R clutch gear Gr2 is meshed with the first R clutch gear Gr1 and the third R clutch gear Gr3.

The first and second F clutch gears Gf1 and Gf2 and the first to third R clutch gears Gr1 to Gr3, which are shown in FIG. 3, are exemplary only and may be arbitrarily constructed as long as the rotational direction of the transmission shaft 67 in engagement of the forward movement clutch CF and that in engagement of the rearward movement clutch CR are opposite to each other.

The forward movement clutch CF and the rearward movement clutch CR are hydraulic clutches, and the hydraulic oil is supplied to the respective clutches CF and CR from the transmission pump 29. The hydraulic oil to be supplied to the forward movement clutch CF is controlled by the F clutch control valve VF. The hydraulic oil to be supplied to the rearward movement clutch CR is controlled by the R clutch control valve VR. The respective clutch control valves VF and VR are controlled by command signals from the clutch controlling unit 58. The direction of the rotation to be outputted from the FR switch mechanism 65 is configured to be switched when on/off (engagement/disengagement) of the forward movement clutch CF and on/off (engagement/disengagement) of the rearward movement clutch CR are switched. In other words, the forward movement clutch CF serves to connect with the gear mechanism 62 (specifically, the first F clutch gear Gf1) to drive the travelling apparatus 25 in the forward moving direction. The rearward movement clutch CR serves to connect with the gear mechanism 62 (specifically, the first R clutch gear Gr1) to drive the travelling apparatus 25 in the rearward moving direction.

The gearshift mechanism 66 includes the transmission shaft 67, a first planetary gear mechanism 68, a second planetary gear mechanism 69, a Hi/Lo switch mechanism 70 and an output gear 71. The transmission shaft 67 is coupled to the FR switch mechanism 65. The first planetary gear mechanism 68 and the second planetary gear mechanism 69 are disposed coaxially to the transmission shaft 67.

The first planetary gear mechanism 68 includes a first sun gear S1, a plurality of first planet gears P1, a first carrier C1 supporting the plural first planet gears P1, and a first ring gear R1. The first sun gear S1 is coupled to the transmission shaft 67. The plural first planet gears P1 are meshed with the first sun gear S1 and are rotatably supported by the first carrier C1. A first carrier gear Gc1 is provided on the outer peripheral part of the first carrier C1. The first ring gear R1 is meshed with the plural first planet gears P1 and is also rotatable. Additionally, a first ring outer peripheral gear Go1 is provided on the outer periphery of the first ring gear R1.

The second planetary gear mechanism 69 includes a second sun gear S2, a plurality of second planet gears P2, a second carrier C2 supporting the plural second planet gears P2, and a second ring gear R2. The second sun gear S2 is coupled to the first carrier C1. The plural second planet gears P2 are meshed with the second sun gear S2 and are rotatably supported by the second carrier C2. The second ring gear R2 is meshed with the plural second planet gears P2 and is also rotatable. A second ring outer peripheral gear Go2 is provided on the outer periphery of the second ring gear R2. The second ring outer peripheral gear Go2 is meshed with the output gear 71, and the rotation of the second ring gear R2 is outputted to the output shaft 63 through the output gear 71.

The Hi/Lo switch mechanism 70 is a mechanism for selectively switching a driving force transmission path in the power transmission 24 between a first mode and a second mode. In the present exemplary embodiment, the first mode is a low speed mode (a Lo mode) in which the vehicle speed is low, whereas the second mode is a high speed mode (a Hi mode) in which the vehicle speed is high. The present Hi/Lo switch mechanism 70 includes the H clutch CH configured to be engaged in the Hi mode and the L clutch CL configured to be engaged in the Lo mode. The H clutch CH is configured to connect or disconnect the first ring gear R1 and the second carrier C2. On the other hand, the L clutch CL is configured to connect or disconnect the second carrier C2 and a stationary end 72, and is thus configured to prevent or allow rotation of the second carrier C2.

It should be noted that the respective clutches CH and CL are hydraulic clutches, and the hydraulic oil is supplied to the respective clutches CH and CL separately from the transmission pump 29. The hydraulic oil to be supplied to the H clutch CH is controlled by the H clutch control valve VH. The hydraulic oil to be supplied to the L clutch CL is controlled by the L clutch control valve VL. The respective clutch control valves VH and VL are controlled by command signals from the clutch controlling unit 58.

The work vehicle 1 includes a first oil temperature detecting unit 73 and a second oil temperature detecting unit 74. The first oil temperature detecting unit 73 is configured to detect the temperature of the hydraulic oil to be supplied to the L clutch CL (hereinafter referred to as "L clutch oil temperature"). The second oil temperature detecting unit 74 is configured to detect the temperature of the hydraulic oil to be supplied to the H clutch CH (hereinafter referred to as "H clutch oil temperature"). The first oil temperature detecting unit 73 is configured to transmit a detection signal indicating the L clutch oil temperature to the control unit 27. The second oil temperature detecting unit 74 is configured to transmit a detection signal indicating the H clutch oil temperature to the control unit 27.

The first motor MG1 and the second motor MG2 function as drive motors configured to generate a driving force by electric energy. Additionally, the first motor MG1 and the second motor MG2 also function as generators configured to generate electric energy with use of a driving force to be inputted thereto. The first motor MG1 is configured to function as the generator when a command signal is given thereto from the motor controlling unit 55 such that a torque acts on the first motor MG1 in the opposite direction to the rotational direction of the first motor MG1. A first motor gear Gm1 is fixed to the output shaft of the first motor MG1, and is meshed with the first carrier gear Gc1. In other words, the first motor MG1 is connected to a rotary element of the first planetary gear mechanism 68.

A first invertor I1 is connected to the first motor MG1, and a command signal for controlling the motor torque of the first motor MG1 is given to the first invertor U from the motor controlling unit 55. The rotational speed of the first motor MG1 is detected by a first motor rotational speed detecting unit 75. The first motor rotational speed detecting unit 75 is configured to transmit a detection signal indicating the rotational speed of the first motor MG1 to the control unit 27.

The second motor MG2 is constructed similarly to the first motor MG1. A second motor gear Gm2 is fixed to the output shaft of the second motor MG2, and is meshed with the first ring outer peripheral gear Go1. In other words, the second motor MG2 is connected to a rotary element of the first planetary gear mechanism 68. Additionally, a second invertor I2 is connected to the second motor MG2, and a command signal for controlling the motor torque of the second motor MG2 is given to the second invertor I2 from the motor controlling unit 55. The rotational speed of the second motor MG2 is detected by a second motor rotational speed detecting unit 76. The second motor rotational speed detecting unit 76 is configured to transmit a detection signal indicating the rotational speed of the second motor MG2 to the control unit 27.

The capacitor 64 functions as an energy storage for storing energy to be generated by the motors MG1 and MG2. In other words, the capacitor 64 is configured to store electric power generated by each motor MG1, MG2 when each motor MG1, MG2 functions as a generator. It should be noted that a battery, functioning as another electric storage means, may be used instead of the capacitor 64.

The motor controlling unit 55 is generally configured to receive detection signals from a variety of detecting units and give command signals, which indicate command torques to be instructed to the motors MG1 and MG2, to the respective invertors I1 and I2. On the other hand, the clutch controlling unit 58 is generally configured to give command signals for controlling the clutch hydraulic pressures of the respective clutches CF, CR, CH and CL to the respective clutch control valves VF, VR, VH and VL. Accordingly, the gear ratio and the output torque of the power transmission 24 are controlled.

Figure 4:
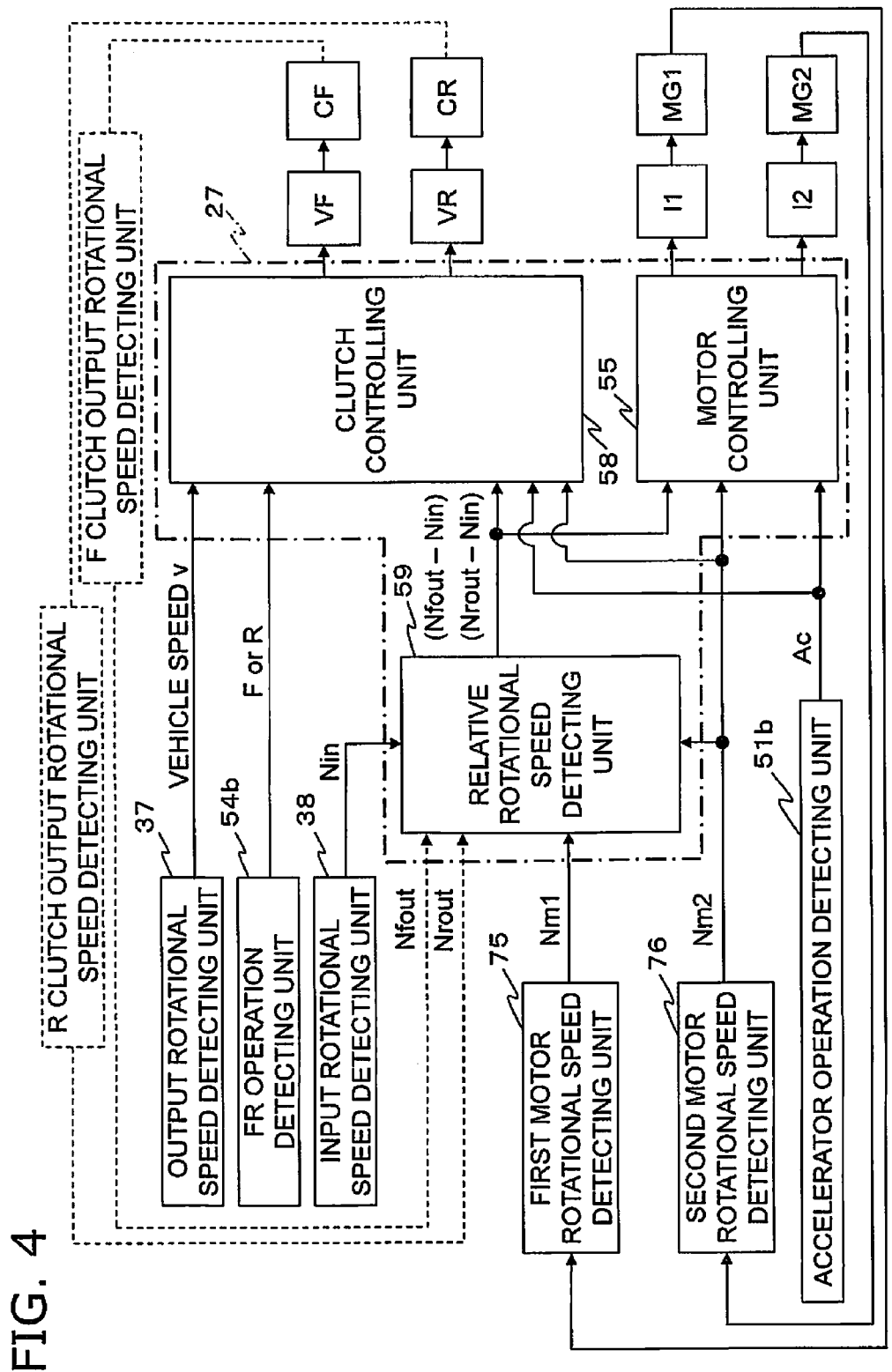
FIG. 4 is a schematic diagram showing an internal construction of a control unit according to the exemplary embodiment and a connection relation between the control unit and the respective constituent elements of the work vehicle that are related to controlling of the power transmission of the present exemplary embodiment.

Next, the detailed construction of the control unit 27 according to the present exemplary embodiment will be thoroughly explained. FIG. 4 is a schematic diagram showing the internal construction of the control unit 27 according to the present exemplary embodiment and a connection relation between the control unit 27 and the respective constituent elements of the work vehicle 1 that are related to controlling of the power transmission 24 of the present exemplary embodiment.

The relative rotational speed detecting unit 59 is configured to detect the relative rotational speed of each clutch CF, CR. The relative rotational speed is obtained as follows.

Regarding the power transmission as shown in FIG. 3, the input rotational speed of each clutch CF, CR corresponds to a rotational speed Nin of the input shaft 61. The input rotational speed detecting unit 38 is configured to detect Nin. The output rotational speed of the clutch CF and that of the clutch CR respectively correspond to a rotational speed Nfout of a clutch output shaft 61$f$ and a rotational speed Nrout of a clutch output shaft 61$r$. Therefore, the relative rotational speed of the clutch CF is calculated by (Nfout−

Nin). Similarly, the relative rotational speed of the clutch CR is calculated by (Nrout−Nin).

The rotational speed Nfout of the clutch output shaft 61f and the rotational speed Nrout of the clutch output shaft 61r can be herein calculated by the following (Equation 1) and (Equation 2) with use of a rotational speed Ns1 of the first sun gear S1.

$$Nfout = Ns1 \times (Zgf2/Zgf1) \quad \text{(Equation 1)}$$

Zgf1: the number of teeth of the first F clutch gear Gf1
Zgf2: the number of teeth of the second F clutch gear Gf1

$$Nrout = Ns1 \times Zgr3/Zgr1 \quad \text{(Equation 2)}$$

Zgr1: the number of teeth of the first R clutch gear Gr1
Zgr3: the number of teeth of the second R clutch gear Gr2

The rotational speed Ns1 of the first sun gear S1 can be calculated by the following (Equation 3).

$$NS1 = -Zr1/Zs1 \times Nr1 + Nc1 \times (Zs1+Zr1)/Zs1 \quad \text{(Equation 3)}$$

Nr1: the rotational speed of the first ring gear R1
Nc1: the rotational speed of the first carrier C1
Zs1: the number of teeth of the first sun gear S1
Zr1: the number of teeth of the first ring gear R1

The rotational speed Nr1 of the first ring gear R1 and the rotational speed Nc1 of the first carrier C1 can be calculated by the following (Equation 4) and (Equation 5).

$$Nr1 = Nm2 \times (-Zm2/Zgo1) \quad \text{(Equation 4)}$$

Nm2: the rotational speed of the second motor MG2
Zm2: the number of teeth of the second motor gear Gm2
Zgo1: the number of teeth of the first ring outer peripheral gear Go1

$$Nc1 = Nm1 \times (-Zm1/Zgc1) \quad \text{(Equation 5)}$$

Nm1: the rotational speed of the first motor MG1
Zm1: the number of teeth of the first motor gear Gm1
Zgc1: the number of teeth of the first carrier gear Gc1

It should be noted that regarding the positive/negative sign of the rotational speed in (Equation 1) to (Equation 5), the rotational direction of the input shaft 61 is defined as positive whereas the other rotational direction is defined as negative. Therefore, the rotational speed Nin of the input shaft 61 normally has a positive value.

The first motor rotational speed detecting unit 75 is configured to detect the rotational speed Nm1 of the first motor MG1. The second motor rotational speed detecting unit 76 is configured to detect the rotational speed Nm2 of the second motor MG2. Therefore, the relative rotational speed detecting unit 59 is capable of obtaining the rotational speed Nfout of the clutch output shaft 61f or the rotational speed Nrout of the clutch output shaft 61r with use of the rotational speed Nm1 of the first motor MG1 and the rotational speed Nm2 of the second motor MG2. Then, the relative rotational speed detecting unit 59 is capable of calculating the relative rotational speed of the clutch CF or CR with use of the obtained Nfout or Nrout and the rotational speed Nin of the input shaft 61 to be detected by the input rotational speed detecting unit 38. Therefore, in FIG. 4, the relative rotational speed detecting unit 59 is configured to output the relative rotational speed (Nfout−Nin) or (Nrout−Nin) of the clutch CF or CR by inputting the rotational speed Nin of the input shaft 61, the rotational speed Nm1 of the first motor MG1 and the rotational speed Nm2 of the second motor MG2.

It should be noted that instead of the above, the work vehicle 1 may be additionally equipped with an F clutch output rotational speed detecting unit for detecting the rotational speed Nfout of the clutch output shaft 61f and an R clutch output rotational speed detecting unit for detecting the rotational speed Nrout of the clutch output shaft 61r. In the construction, the relative rotational speed detecting unit 59 may be configured to calculate the relative rotational speed of the clutch CF with use of the rotational speed Nin of the input shaft 61 and the rotational speed Nfout to be detected by the F clutch output rotational speed detecting unit. Additionally, the relative rotational speed detecting unit 59 may be configured to calculate the relative rotational speed of the clutch CR with use of the rotational speed Nin of the input shaft 61 and the rotational speed Nrout to be detected by the R clutch output rotational speed detecting unit. In FIG. 4, dotted lines directed from the clutches CF and CR to the relative rotational speed detecting unit 59 indicate the flows of signals in this construction.

As shown in FIG. 4, the clutch controlling unit 58 is configured to receive a vehicle speed v to be detected by the output rotational speed detecting unit 37, a forward movement instruction signal F or a rearward movement instruction signal R of the work vehicle 1 to be detected by the FR operation detecting unit 54b, the rotational speed Nm2 of the second motor MG2 to be detected by the second motor rotational speed detecting unit 76, an accelerator operating amount Ac to be detected by the accelerator operation detecting unit 51b, and the relative rotational speed (Nfout−Nin) or (Nrout−Nin) of the clutch CF or CR to be detected by the relative rotational speed detecting unit 59, and is configured to give a command signal for controlling the clutch hydraulic pressure of each clutch CF, CR to each clutch control valve VF, VR on the basis of the absolute value of the relative rotational speed |Nfout−Nin− or −Nrout−Nin−.

Additionally, as shown in FIG. 4, the motor controlling unit 55 is configured to receive the rotational speed Nm2 of the second motor MG2 to be detected by the second motor rotational speed detecting unit 76, the accelerator operating amount Ac to be detected by the accelerator operation detecting unit 51b, and the relative rotational speed (Nfout−Nin) or (Nrout−Nin) of the clutch CF or CR to be detected by the relative rotational speed detecting unit 59, and is configured to give a command signal, which indicates a command torque to be instructed to each motor MG1, MG2, to each invertor I1, I2. Actions of the control unit 27 and the power transmission 24 will be hereinafter explained in detail with a plurality of practical examples.

First Practical Example

Figure 5A:
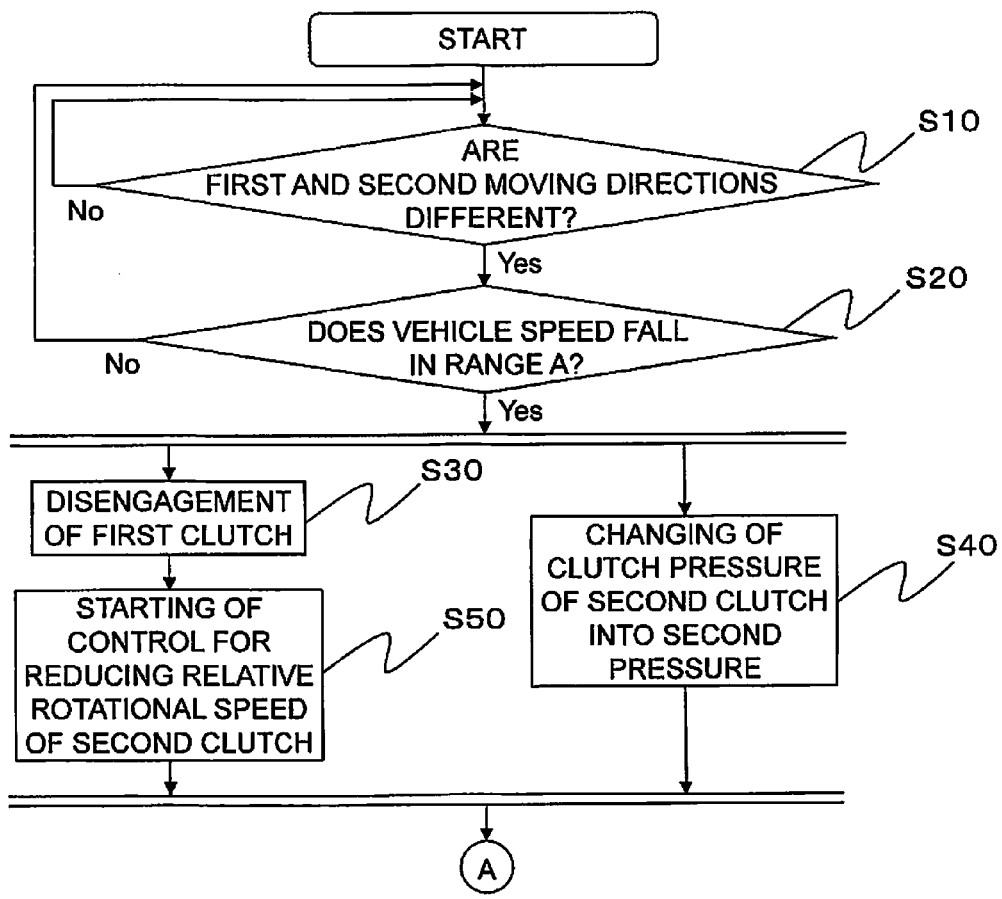
FIG. 5A is a flowchart showing a schematic action of the power transmission in a first practical example.
Figure 5B:
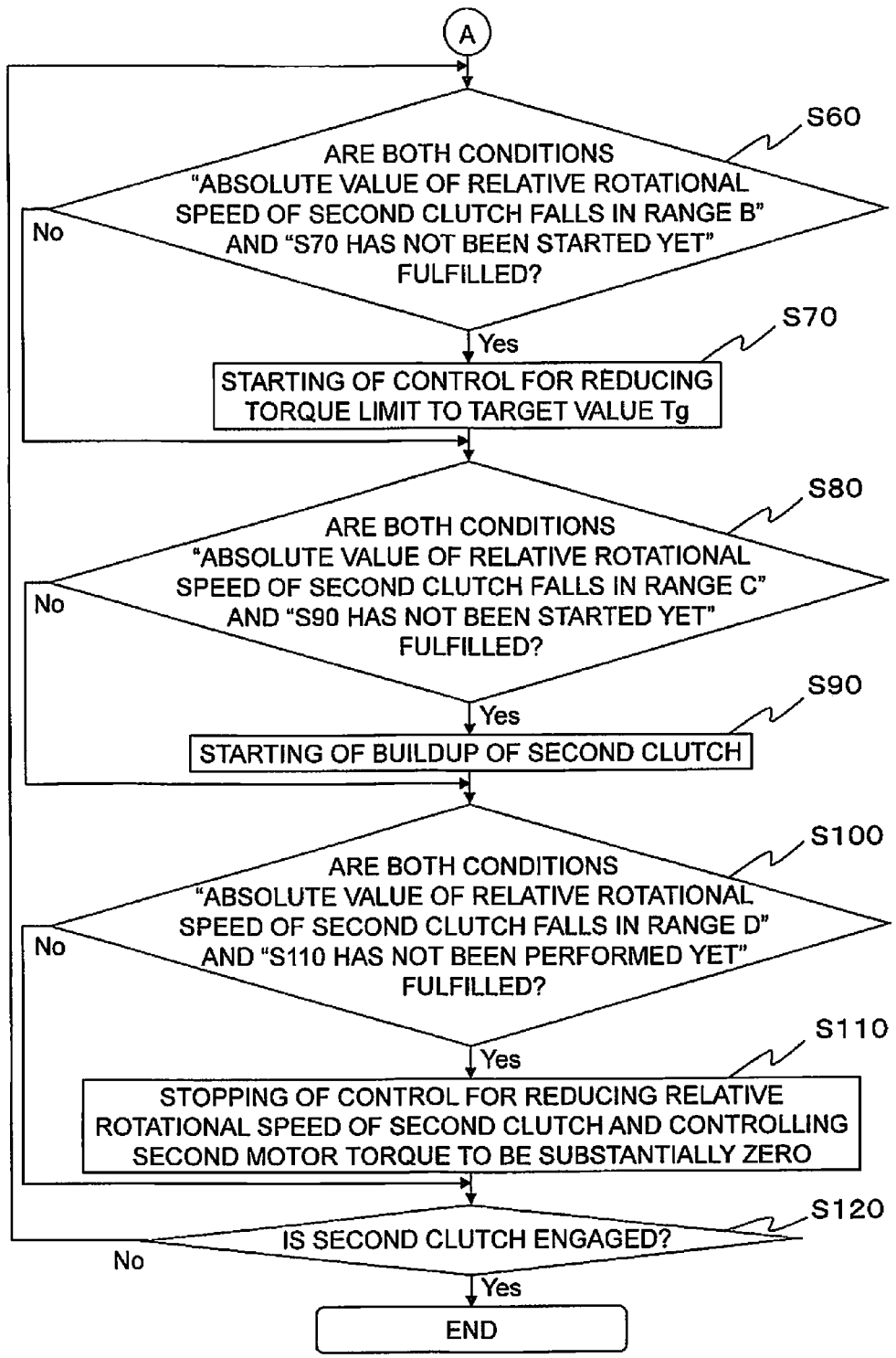
FIG. 5B is a flowchart showing the schematic action of the power transmission in the first practical example.

With FIGS. 5A, 5B and 6A-6F, explanation will be herein described for a schematic action of the power transmission 24 in a situation that the operator operates the FR operating device 54 to switch the moving direction of the work vehicle 1 from the forward direction to the rearward direction. FIGS. 5A and 5B are flowcharts for showing the schematic action of the power transmission 24 of the first practical example.

In Step S10, the motor controlling unit 55 and the clutch controlling unit 58 stand by until a first moving direction to be inputted through the FR operating device 54 by the instruction of the operator becomes different from a second moving direction to be determined based on the vehicle speed detected by the output rotational speed detecting unit 37.

Figure 6:
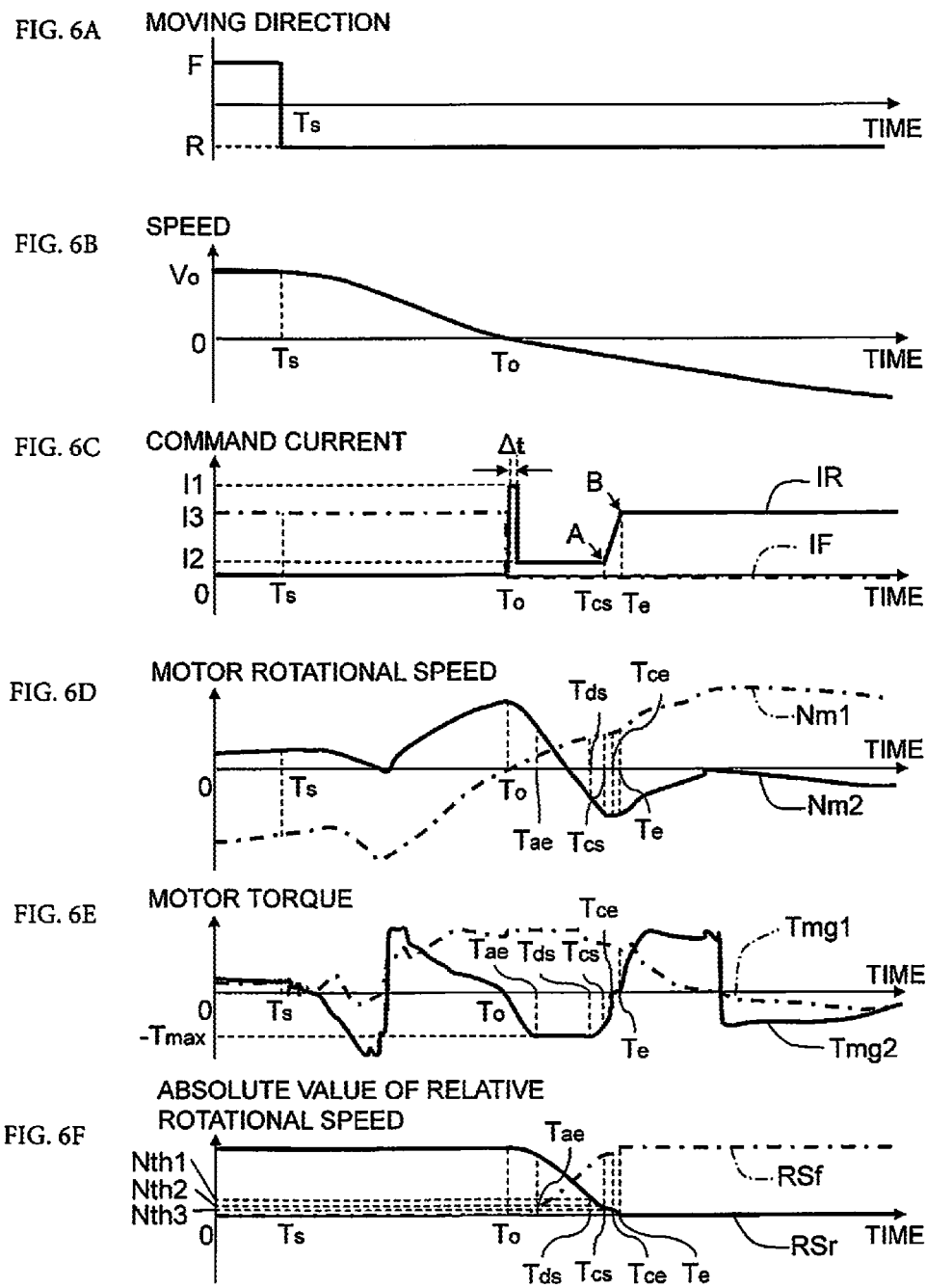
FIGS. 6A-6F show exemplary time-series variations in a variety of parameters of the work vehicle in the first practical example.

FIGS. 6A-6F are exemplary time-series variations in a variety of parameters of the work vehicle in the first practical example. FIG. 6A shows an exemplary time-series variation in moving direction of the work vehicle 1 to be instructed through the operation of the FR operating device 54 by the operator. FIG. 6A shows a condition that the moving direction indicated by "F" is forward movement, whereas the moving direction indicated by "R" is rearward movement. As shown in FIG. 6A, the moving direction to be instructed is switched from "F" to "R" at Time Ts. According to this, in the present practical example, the first moving direction is the forward moving direction before Time Ts, whereas the first moving direction is the rearward moving direction at and after Time Ts. It should be noted that in the following explanation, the clutch CF to be engaged at or before Time Ts will be referred to as a first clutch, whereas the clutch CR to be disengaged at or before Time Ts will be referred to as a second clutch.

FIG. 6B shows an exemplary time-series variation in vehicle speed of the work vehicle 1. In FIG. 6B, the positive sign of the speed indicates the forward movement whereas the negative sign thereof indicates the rearward movement. As shown in FIG. 6B, the vehicle speed of the work vehicle 1 gradually decreases as time passes since Time Ts. To realize this, when the driving force transmission path in the power transmission 24 is in the Hi mode at Time Ts, processing of switching the power transmission path into the Lo mode at and after Time Ts is also performed. According to this, the second moving direction is the forward moving direction at and before Time To when the vehicle speed becomes 0. In other words, the first moving direction and the second moving direction are different from each other in a period between Time Ts and Time To. Thus, the processing of Step S20 and thereafter will be performed in the period between Time Ts and Time To.

In Step S20, the motor controlling unit 55 and the clutch controlling unit 58 stand by until the vehicle speed falls in a range A. In the present practical example, the range A is defined as a range around the vehicle speed 0. Then, the first clutch (CF) is disengaged at Time To at which the vehicle speed becomes 0 (Step S30).

FIG. 6C shows an exemplary time-series variation in command signals to be transmitted to the respective clutch control valves VF and VR from the clutch controlling unit 58. In FIG. 6C, the vertical axis indicates the magnitude of command current of the command signal. In FIG. 6C, a solid line indicates time-series variation in magnitude of command current of a command signal IR to be transmitted to the clutch control valve VR from the clutch controlling unit 58. A dashed dotted line indicates time-series variation in magnitude of command current of a command signal IF to be transmitted to the clutch control valve VF from the clutch controlling unit 58. It should be noted that the relation between the command signals to be transmitted to the respective clutch control valves VF and VR from the clutch controlling unit 58 and the clutch pressures of the respective clutches CF and CR is the same as that described in Japan Laid-open Patent Application Publication No. 2009-250392 or that described in Japan Patent No. 5185093, and therefore, the detailed explanation thereof will not be described.

As shown in FIG. 6C, the clutch controlling unit 58 outputs the command signal IF having a predetermined command current value I3 to the clutch control valve VF until Time To when the vehicle speed becomes 0. However, the clutch controlling unit 58 outputs the command signal IF having a command current value 0 to the clutch control valve VF at Time To. In other words, the clutch controlling unit 58 disengages the forward movement clutch CF at the vehicle speed 0.

Additionally, the clutch controlling unit 58 starts preparation for engaging the rearward movement clutch CR at Time To when the vehicle speed falls in the range A (Step S40). In other words, to smoothen the initial action of the R clutch control valve VR, the clutch controlling unit 58 outputs the command signal IR having a command current value I1 to the R clutch control valve VR in a minute period of time Δt from Time To. It should be noted that the command current value I1 may be equal to the command current value I3. It should be noted that in the following explanation, a series of clutch actions from the action in Step S40 to clutch engagement are collectively referred to as modulation or a modulation action. Clutch engagement herein means that a holding pressure acts on the clutch, thereby the clutch is engaged such that the rotational speed of the input shaft and that of the output shaft in the clutch are matched. The holding pressure means a pressure at which the clutch is capable of transmitting without slippage a torque applied within a designed range. The command current value I3 refers to a command value of pressure to be constantly outputted in a clutch engaged state.

Thereafter, the clutch controlling unit 58 outputs the command signal IR having a command current value I2 until the relative rotational speed of the rearward movement clutch CR falls in a preliminarily set range C (the detailed explanation thereof will be described below). The rearward movement clutch CR is filled with the hydraulic oil by the command signal IR, and the clutch pressure of the rearward movement clutch CR becomes a fill pressure to be described. In other words, in Step S40, after the first clutch (CF) is disengaged, the clutch controlling unit 58 changes the clutch pressure of the second clutch (CR) into a predetermined second pressure (the fill pressure) that is lower than a first pressure (a pressure to be supplied by the command current I3) at which the second clutch (CR) is engaged. It should be noted that even when the clutch pressure of the second clutch (CR) becomes the second pressure, a torque is hardly transmitted in the second clutch (CR).

On the other hand, after the processing of Step S30 is finished and the forward movement clutch CF is disengaged, the motor controlling unit 55 controls either the second motor MG2 or both of the first motor MG1 and the second motor MG2 so as to reduce the relative rotational speed of the second clutch (CR) (Step S50). Especially in Step S50, the motor controlling unit 55 controls the second motor MG2 so as to reduce the relative rotational speed of the second clutch (CR). Additionally, the motor controlling unit 55 causes the first motor MG1 to output a torque in accordance with a target traction force to resolve slow response in acceleration. The content will be explained with FIGS. 6D to 6F. FIG. 6D shows time-series variation in rotational speed of the first motor MG1 and that of the second motor MG2. FIG. 6E shows time-series variation in torque of the first motor MG1 and that of the second motor MG2 in the situation of FIG. 6D. FIG. 6F shows time-series variation in relative rotational speed of the clutch CF and that of the clutch CR in the situation of FIG. 6D. In FIG. 6D, a solid line indicates the rotational speed Nm2 of the second motor MG2, whereas a dashed dotted line indicates the rotational speed Nm1 of the first motor MG1. In FIG. 6E, a solid line indicates a torque Tmg2 of the second motor MG2, whereas a dashed dotted line indicates a torque Tmg1 of the first motor MG1. In FIG. 6F, a solid line indicates a relative rotational speed RSr of the rearward movement clutch CR, whereas a dashed dotted line indicates a relative rotational speed RSf of the forward movement clutch CF.

The input rotational speed of the clutch CF is Nin, and thus, as is obvious with reference to (Equation 1), the rotational speed Ns1 of the first sun gear S1 is negative in a condition immediately before disengagement of the forward movement clutch CF (immediately before Time To). Therefore, as shown in FIG. 6D, the rotational speed Nm2 of the second motor MG2 is positive at Time To. To reduce the relative rotational speed of the rearward movement clutch CR after disengagement of the forward movement clutch CF, it is required, according to (Equation 2), to change the rotational speed NS1 of the first sun gear into positive because the input rotational speed of the clutch CR is also Nin. With reference to (Equation 3) to (Equation 5), to change the rotational speed Ns1 of the first sun gear S1 into positive, it is desirable to change the rotational speed Nm2 of the second motor MG2 into negative and to change the rotational speed Nm1 of the first motor MG1 into positive. In view of the above, the motor controlling unit 55 controls the first motor MG1 and the second motor MG2 to reduce the rotational speed of the second motor MG2 and increase the rotational speed of the first motor MG1 in a period from Time To to Time Tcs. Especially, the motor controlling unit 55 controls the second motor MG2 as follows.

The motor controlling unit 55 controls the torque of the second motor MG2 by performing, under setting of a torque limit, a control of reducing the relative rotational speed of the rearward movement clutch CR, for instance, a P1 control where the target value of (Nrout−Nin) is set to be 0. The torque limit is herein the absolute value of the maximum torque allowed to be outputted during speed control. A torque limit Tlim(n) in a control step n is defined as follows.

$$T\lim(0)=T\lim 0 \quad \text{(Equation 6)}$$

Tlim0: an initial value that is equal to 0 or close to 0

$$T\lim(n)=\min(T\lim(n-1)+dT\text{up},T\text{max}) \quad \text{(Equation 7)}$$

dTup: an increase limit value of the torque limit per control step
Tmax: the maximum value of the torque limit
min(A, B): a smaller one of values A and B In short, according to (Equation 6) and (Equation 7), the motor controlling unit 55 gradually increases the torque limit from the predetermined initial value Tlim0 to the maximum value Tmax after the first clutch (CF) is disengaged. It should be noted that the torque limit can be even acutely increased from the predetermined initial value Tlim0 to the maximum value Tmax when the value of dTup is set to be large, but it is preferable for the value of dTup not to be extremely large to alleviate shock of the vehicle body. Additionally, the maximum value Tmax is not the maximum value of the torque that can be outputted from the motor but the maximum value of the torque limit that is set for the present control. Moreover, the torque limit control by (Equation 6) and (Equation 7) is performed under the condition of "|Nrout−Nin|>Nth2". Nth2 is a threshold of the absolute value of the relative rotational speed of the rearward movement clutch CR (see FIG. 6F).

As shown in FIG. 6E, through the control as described above, the torque of the second motor MG2 linearly decreases from 0 in a period from Time To to Time Tae. The torque limit becomes Tmax at Time Tae, and thus, the torque value of the second motor MG2 becomes constant at −Tmax from Time Tae to Time Tds. Through the torque control as descried above, as shown in FIG. 6D, the rotational speed of the second motor MG2 gradually decreases from positive to negative in a period from Time To to Time Tds. Consequently, as shown in FIG. 6F, the relative rotational speed of the clutch CR gradually approaches 0.

Next in Step S60 of FIG. 5B, the motor controlling unit 55 determines whether or not the absolute value |Nrout−Nin|, of the relative rotational speed of the second clutch (CR) falls in a preliminarily set range B [0, Nth1], and simultaneously, Step S70 to be described has not been started yet. Nth1 is herein a threshold of the relative rotational speed of the rearward movement clutch CR. In other words, in Step S60, the motor controlling unit 55 determines whether or not the relative rotational speed (Nrout−Nin) of the second clutch CR falls in a preliminarily set range B'[−Nth1, Nth1], and simultaneously, Step S70 to be described has not been started yet.

Next, when the relative rotational speed of the second clutch (CR) falls in the range B and simultaneously Step S70 has not been started yet (Yes in Step S60), the motor controlling unit 55 starts performing a control of reducing the torque limit to the predetermined target value Tg (Step S70). Specifically, the motor controlling unit 55 defines the torque limit Tlim(n) in a control step n as described in (Equation 8).

$$T\lim(n)=\max(T\lim(n-1)-dT\text{down},Tg) \quad \text{(Equation 8)}$$

dTdown: a reduction limit value of the toque limit per control step
Tg: a target value of the torque limit
max(A, B): a larger one of values A and B It should be noted that the torque limit can be even acutely reduced to the predetermined target value Tg by increasing the value of dTdown, but it is preferable for the value of dTdown not to be extremely large to alleviate shock of the vehicle body. In other words, in Step S70, it is preferable to gradually reduce the torque limit to the predetermined target value Tg.

Additionally, before the absolute value |Nrout−Nin| of the relative rotational speed falls in the range B, the toque limit is set by (Equation 7), and thus, the result of the torque limit Tlim(n−1) calculated in (Equation 7) may be used in calculating the torque limit Tlim(n) by first-time application of (Equation 8). Through execution of the control as described above, shock to be applied to the vehicle body is alleviated in buildup (to be described) of the pressure of the clutch CR (Step S90).

According to FIG. 6F, the absolute value |Nrout−Nin| of the relative rotational speed of the second clutch (CR) falls in the range B [0, Nth1] at and after Time Tds. Therefore, as shown in FIG. 6E, the torque value of the second motor MG2 increases from −Tmax in accordance with reduction in torque limit at and after Time Tds.

Next in Step S80 of FIG. 5B, the clutch controlling unit 58 determines whether or not the absolute value |Nrout−Nin| of the relative rotational speed of the second clutch CR falls in the preliminarily set range C, and simultaneously, Step S90 to be described has not been started yet. The range C is [0, Nth2] (Nth2 is a threshold of the relative rotational speed of the rearward movement clutch CR; see FIG. 6F). In other words, in Step S80, the clutch controlling unit 58 determines whether or not the relative rotational speed (Nrout−Nin) of the second clutch CR falls in a preliminarily set range C' [−Nth2, Nth2] and Step S90 to be described has not been started yet. It should be noted that in FIG. 6F, Nth2 is depicted as being less than Nth1, but may be equal to Nth1 or alternatively may be greater than Nth1.

Then, when (at Time Tcs) the absolute value |Nrout−Nin| of the relative rotational speed of the clutch CR is less than the predetermined threshold Nth2, and simultaneously, Step S90 has not been started yet (Yes in Step S80), the clutch controlling unit 58 starts buildup of the second clutch (CR) (Step S90). In other words, as shown in FIG. 6C, the clutch controlling unit 58 increases the value of command current to be transmitted to the clutch control valve VR. That is, the clutch controlling unit 58 increases the clutch pressure of the rearward movement clutch CR to finally engage the rearward movement clutch CR. A clutch action as described above is referred to as buildup.

Next, the motor controlling unit 55 controls the torque of the second motor MG2 as follows not to apply large shock to the vehicle body in the final stage of the modulation for the clutch CR.

In Step S100 of FIG. 5B, the motor controlling unit 55 determines whether or not the absolute value |Nrout−Nin| of the relative rotational speed of the second clutch (CR) falls in a preliminarily set range D [0, Nth3], and simultaneously, Step S110 to be described has not been started yet. Nth3 is herein a threshold of the relative rotational speed of the rearward movement clutch CR. In other words, it is determined in Step S100 whether or not the relative rotational speed (Nrout−Nin) of the second clutch CR falls in a preliminarily set range D' [−Nth3, Nth3] and Step S110 has not been started yet. It should be noted that in FIG. 6F, Nth3 is depicted as being less than Nth2, but may be equal to Nth2 or alternatively may be greater than Nth2.

Next, when the relative rotational speed of the second clutch (CR) falls in the range D (Yes in Step S100), the motor controlling unit 55 controls the torque of the second motor MG2 to be substantially zero(Step S110). Controlling the torque of the second motor MG2 to be substantially zero means to transmit to the second motor MG2, a command signal for setting a torque to be 0. Specifically, the motor controlling unit 55 sets the torque limit Tlim(n) in the control step n to be 0. Alternatively, supply of electric current to the second motor MG2 may be electrically blocked, or the control state of the second motor MG2 may be set to be a servo-off (uncontrolled) state.

According to FIG. 6F, the absolute value |Nrout−Nin| of the relative rotational speed of the second clutch (CR) falls in the range D from Time Tce to Time Te. Therefore, as shown in FIG. 6E, the torque value of the second motor MG2 is a value close to 0 from Time Tce to Time Te.

Finally in Step S120 of FIG. 5B, the clutch controlling unit 58 determines whether or not the second clutch (CR) is engaged. When the second clutch (CR) is not engaged (No in Step S120), processing of steps S60 to S110 are repeated. As shown in FIG. 6C, at Time Te, the clutch controlling unit 58 outputs the command current I3 to the clutch control valve VR in order to maintain the clutch CR in the engaged state. In other words, the second clutch (CR) is engaged (Yes in Step S120). At and after Time Te, the clutch controlling unit 58 continuously outputs the command current I3 to the clutch control valve VR to maintain the clutch CR in the engaged state until an operation of the FR operating device is newly performed by the operator.

Next, advantageous effects of the present practical example will be explained. After the clutch controlling unit 58 disengages the first clutch (CF), the motor controlling unit 55 controls the rotational speed of the second motor MG2 such that the relative rotational speed of the second clutch (CR) approaches 0. Then, after the relative rotational speed of the second clutch (CR) is reduced to a predetermined magnitude, the clutch controlling unit 58 starts buildup of the second clutch (CR). As a result, the control unit 27 is capable of reducing abrasion of the second clutch (CR). Additionally, controlling the relative rotational speed of the second clutch (CR) with torque limit prevents large shock from being applied to the vehicle body and thereby it prevents the operator from being feel uncomfortable, and additionally it prevents the rotational speed from excessively varying and thereby it prevents bearings connected to the rotational shaft and so forth from being damaged or broken. Moreover, the control unit 27 is configured to switch the clutch after the vehicle speed becomes roughly 0, and due to this, over-rotation of the gear mechanism 62 of the power transmission 24 can be prevented and the load of the engine 21 can be also reduced. Besides, when the clutch pressure of the second clutch (CR) increases, the motor controlling unit 55 is configured to reduce or zero the torque of the second motor MG2, whereby electric power to be consumed by the second motor MG2 can be inhibited.

Second Practical Example

Figure 7A:
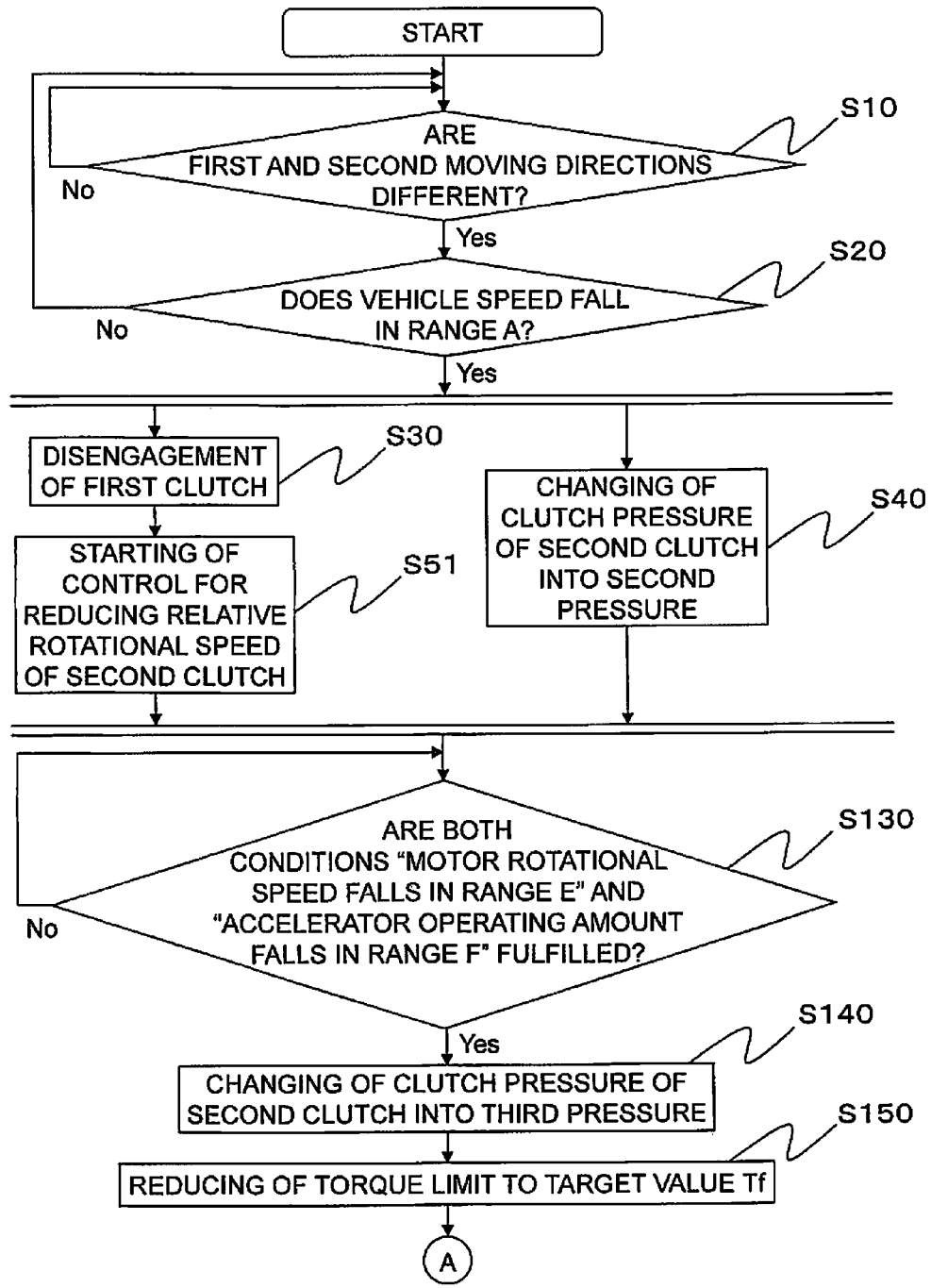
FIG. 7A is a flowchart showing a schematic action of the power transmission in a second practical example.
Figure 7B:
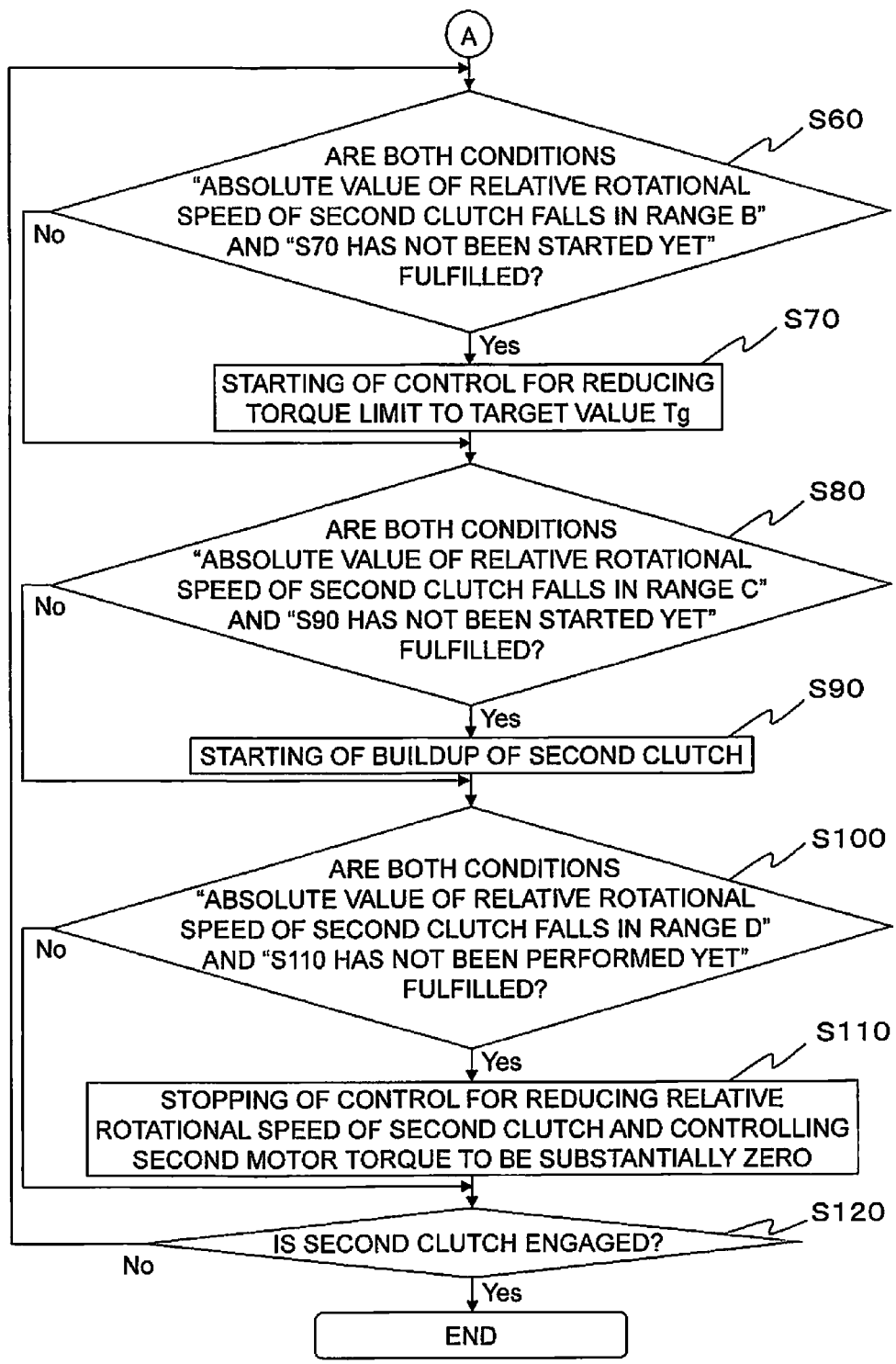
FIG. 7B is a flowchart showing the schematic action of the power transmission in the second practical example.

In the present practical example, an example will be explained that the work vehicle 1 is configured to reduce the relative rotational speed of the second clutch with use of not only the driving force of the motor but also the driving force of the engine. FIGS. 7A and 7B are flowcharts for showing a schematic action of the power transmission 24 in the second practical example. In FIGS. 7A and 7B, the same reference signs are assigned to the same processing as those in the first practical example, and the detailed explanation thereof will not be described. FIGS. 8A to 8F are charts for explaining the second practical example and correspond to FIGS. 6A to 6F. It should be noted that for easy comparison with the first practical example, values of the first practical example, which are different from those of the second practical example, are depicted with fine lines in some charts of FIGS. 8A to 8F. Additionally in FIGS. 8A to 8F, the same reference signs are assigned to things that mean the same contents as those in the first practical example. The schematic action of the power transmission 24 in the second practical example will be hereinafter explained by mainly focusing on differences from the first practical example.

Figure 8:
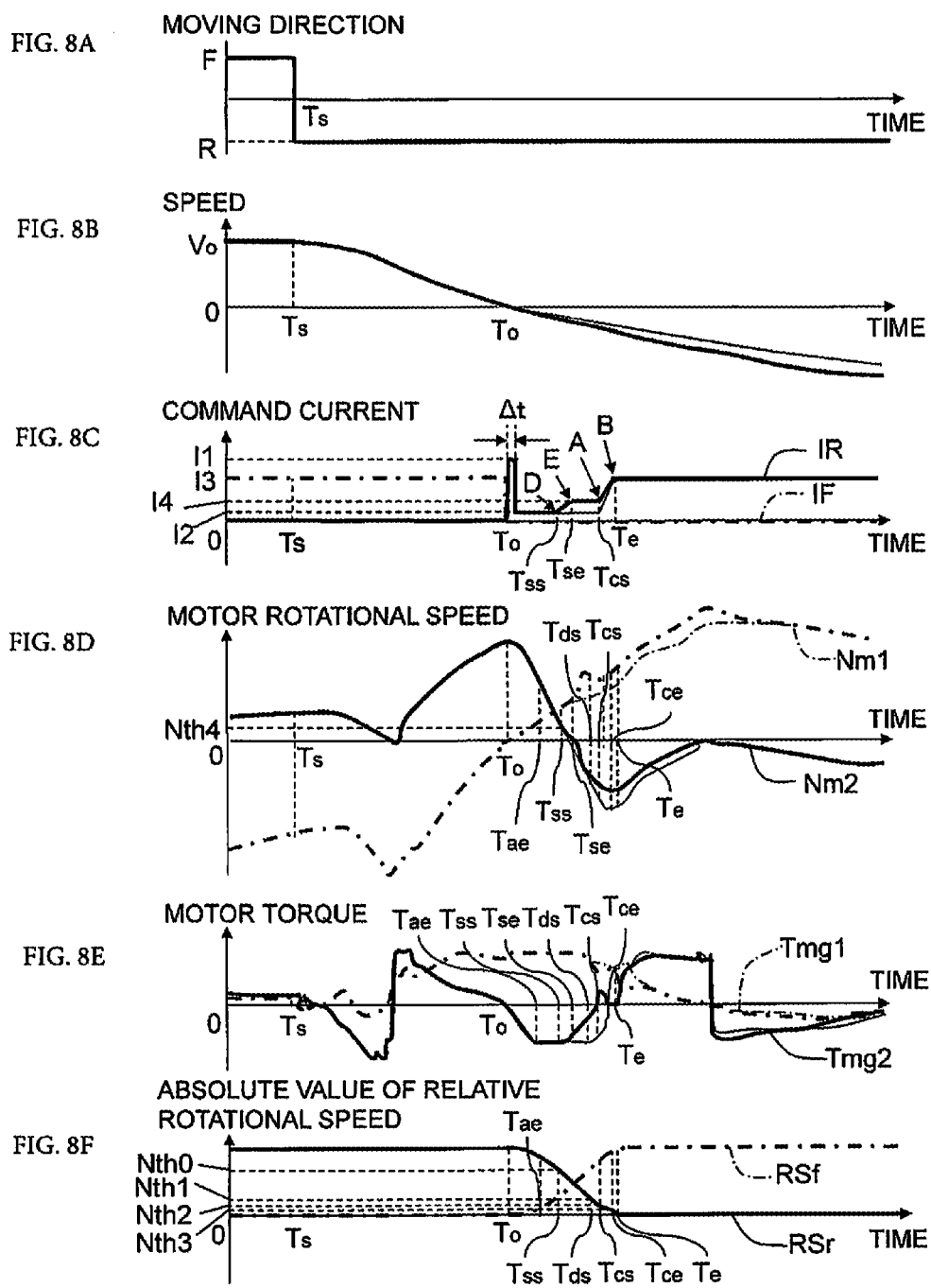
FIGS. 8A-8F show exemplary time-series variations in a variety of parameters of the work vehicle in the second practical example.

As shown in FIGS. 8A and 8B, in the second practical example, it is similarly assumed that the moving direction to be instructed is switched from "F" to "R" at Time Ts and the vehicle speed becomes 0 at Time To. At this time, as shown in FIG. 8C, the clutch controlling unit 58 disengages the first clutch (CF) at Time To (Step S30) and changes the clutch pressure of the second clutch (CR) into the second pressure (the fill pressure) (Step S40). On the other hand, the motor controlling unit 55 controls the second motor MG2 so as to reduce the relative rotational speed of the second clutch (CR) after the first clutch (CF) is disengaged (Step S51). It should be noted that Step S51 is different from Step S50 in that increase in torque limit by (Equation 7) is performed when No is determined in Step S130, in other words, only either when the rotational speed of the second motor MG2 is out of a range E or when the accelerator operating amount is out of a range F. The range E and the range F will be described below in detail.

Next in Step S130, the clutch controlling unit 58 and the motor controlling unit 55 determine whether or not the rotational speed Nm2 of the second motor MG2 falls in the range E and simultaneously the accelerator operating amount Ac falls in the range F. The range E herein means [0, Nth4] (Nth4 is a threshold of the rotational speed Nm2; see FIG. 8D). The range F means [Ath, ∞) (Ath is a threshold of the accelerator operating amount). In other words, the fact that the accelerator operating amount Ac falls in the range F means a condition that the operator presses down an accelerator pedal with a predetermined operating amount or greater (the operator instructs the work vehicle 1 to accelerate). The schematic action of the power transmission 24 will be hereinafter explained on the premise that the accelerator operating amount Ac falls in the range F.

As shown in FIG. 8D, the rotational speed Nm2 of the second motor MG2 falls in the range E at Time Tss (Yes in Step S130). Therefore, the clutch controlling unit 58 changes the clutch pressure of the second clutch (CR) into a third pressure (hereinafter referred to as an assist pressure) (Step S140). Specifically as shown in FIG. 8C, the clutch controlling unit 58 increases the command current value of the command signal IR to be transmitted to the R clutch control valve VR from I2 to I4 corresponding to the third pressure (the assist pressure). The command current I4 is greater than I2 and less than I3. Thus, the third pressure (the assist pressure) is less than the fast pressure (a pressure to be supplied by the command current I3) and is greater than the second pressure (the fill pressure). Therefore, when the clutch pressure of the second clutch (CR) is the assist pressure, the second clutch slips but is in the contact state. At and after Time Tse when the command current value becomes I4, the clutch controlling unit 58 maintains the clutch pressure of the second clutch (CR) at the third pressure (the assist pressure) until buildup of the clutch in Step S90 is performed.

Moreover, the motor controlling unit 55 reduces the torque limit to a target value Tf (Step S150). Specifically, the motor controlling unit 55 defines the torque limit Tlim(n) in the control step n as described in (Equation 10).

$$T\lim(n) = \max(T\lim(n-1) - dT\text{down}, Tf) \quad \text{(Equation 10)}$$

dTdown: the reduction limit value of the torque limit per control step
Tf: a target value of the torque limit It should be noted that the torque limit can be even acutely reduced to the predetermined target value Tf by increasing the value of dTdown, but it is preferable for the value of dTdown not to be extremely large to alleviate shock of the vehicle body. In other words, in Step S150, it is preferable to gradually reduce the torque limit to the predetermined target value Tf.

Additionally, before the rotational speed Nm2 of the second motor MG2 falls in the range E, and simultaneously, the accelerator operating amount Ac falls in the range F, the torque limit is set by (Equation 7), and thus, the result of the torque limit Tlim(n−1) calculated in (Equation 7) may be used in calculating the torque limit Tlim(n) by first-time application of (Equation 10).

According to FIG. 8D, the rotational speed Nm2 of the second motor MG2 falls in the range E at and after Time Tss. Therefore, as shown in FIG. 8E, the torque value of the second motor MG2 increases from −Tmax with decrease in torque limit at and after Time Tss.

The subsequent processing to be performed by the motor controlling unit 55 and the clutch controlling unit 58 are roughly the same as those in the first practical example. It should be noted that the processing of Step S70 may be omitted when the torque limit is less than the target value Tg at a point of time when the relative rotational speed of the second clutch falls in the range B (Yes in Step S60) as a result of the processing of Step S150.

Next, effects peculiar to the present practical example will be explained. Compared to the first practical example, the second practical example is configured to synchronize the clutch input shaft and the clutch output shaft of the second clutch (CR) with additional use of the friction force of the second clutch (CR). Due to this, as shown in FIG. 8E, a torque in a reverse direction to the rotational direction is reduced in the second motor MG2, but instead, a torque in the rotation direction can be increased in the first motor MG1. As a result, as shown in FIG. 8D, the rotational speed of the first motor MG1 can be increased, and the magnitude of the reverse rotational speed of the second motor MG2 can be reduced. Consequently, as shown in FIG. 8B, the rearward moving speed can be increased at and after Time To. Thus, the work vehicle 1 is enhanced in work efficiency.

Figure 9:
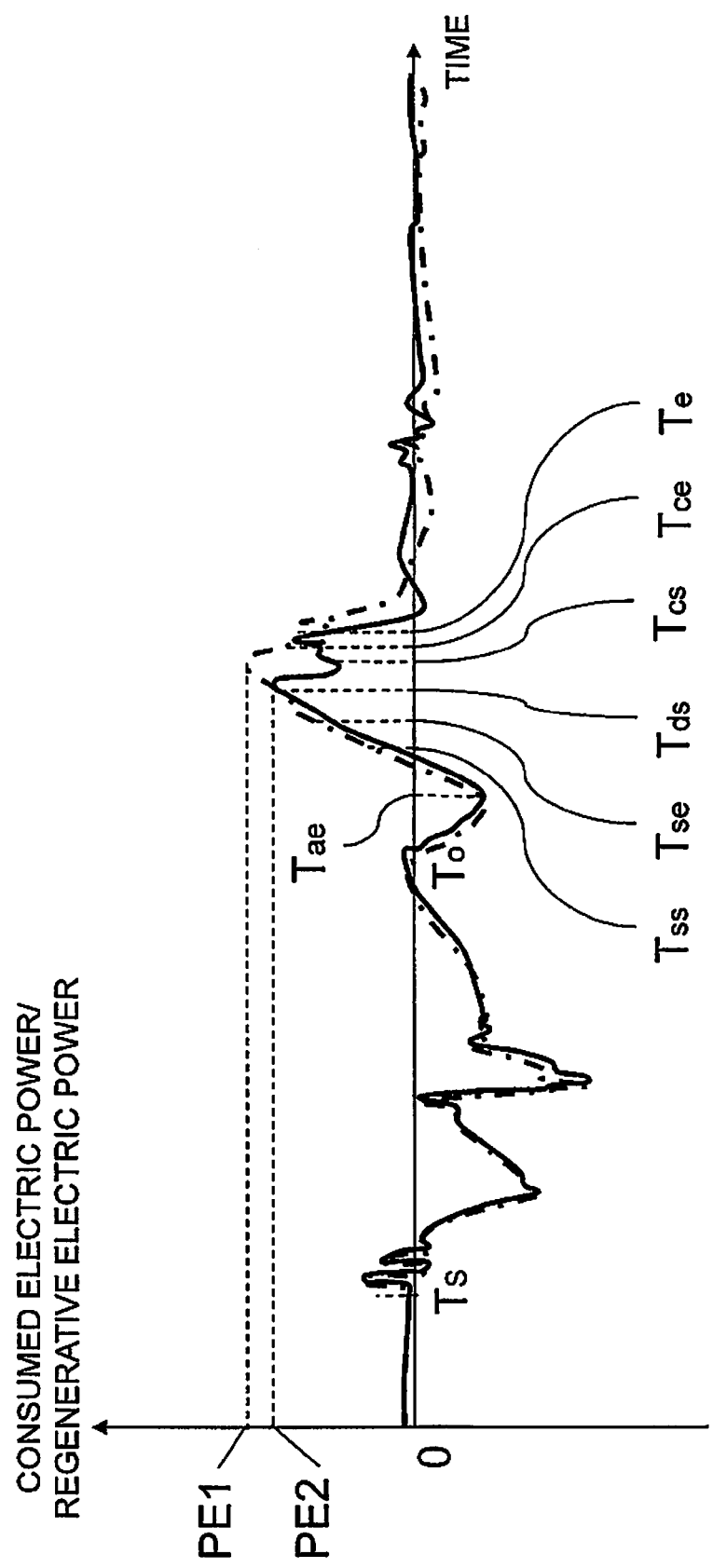
FIG. 9 shows time-series variation in consumed electric power/regenerative electric power by all motors in the first and second practical examples.

Additionally in terms of consumed electric power/regenerative electric power, the second practical example further has the following features. FIG. 9 shows time-series variation in consumed electric power/regenerative electric power by all the motors in the first and second practical examples. In FIG. 9, a solid line indicates time-series variation in consumed electric power/regenerative electric power by all the motors in the second practical example, whereas a dashed dotted line indicates time-series variation in consumed electric power/regenerative electric power by all the motors in the first practical example. As is obvious from indication in FIG. 9, consumed electric power in the second practical example is smaller than that in the first practical example, especially, in a period from Time Tds to Time Tce. Additionally, a peak value PE2 of consumed electric power in the second practical example is obviously smaller than a peak value PE1 of consumed electric power in the first practical example. Therefore, compared to the work vehicle 1 configured to implement only the first practical example, the work vehicle 1 configured to implement the second practical example in addition to the first practical example can suppress low the maximum electric power to be supplied from the capacitor 64, and can use a small capacity capacitor that the maximum supply power thereof is low and a booster located between the capacitor and the invertor. Therefore, the work vehicle 1 can be reduced in size and in production cost.

Third Practical Example

Figure 10A:
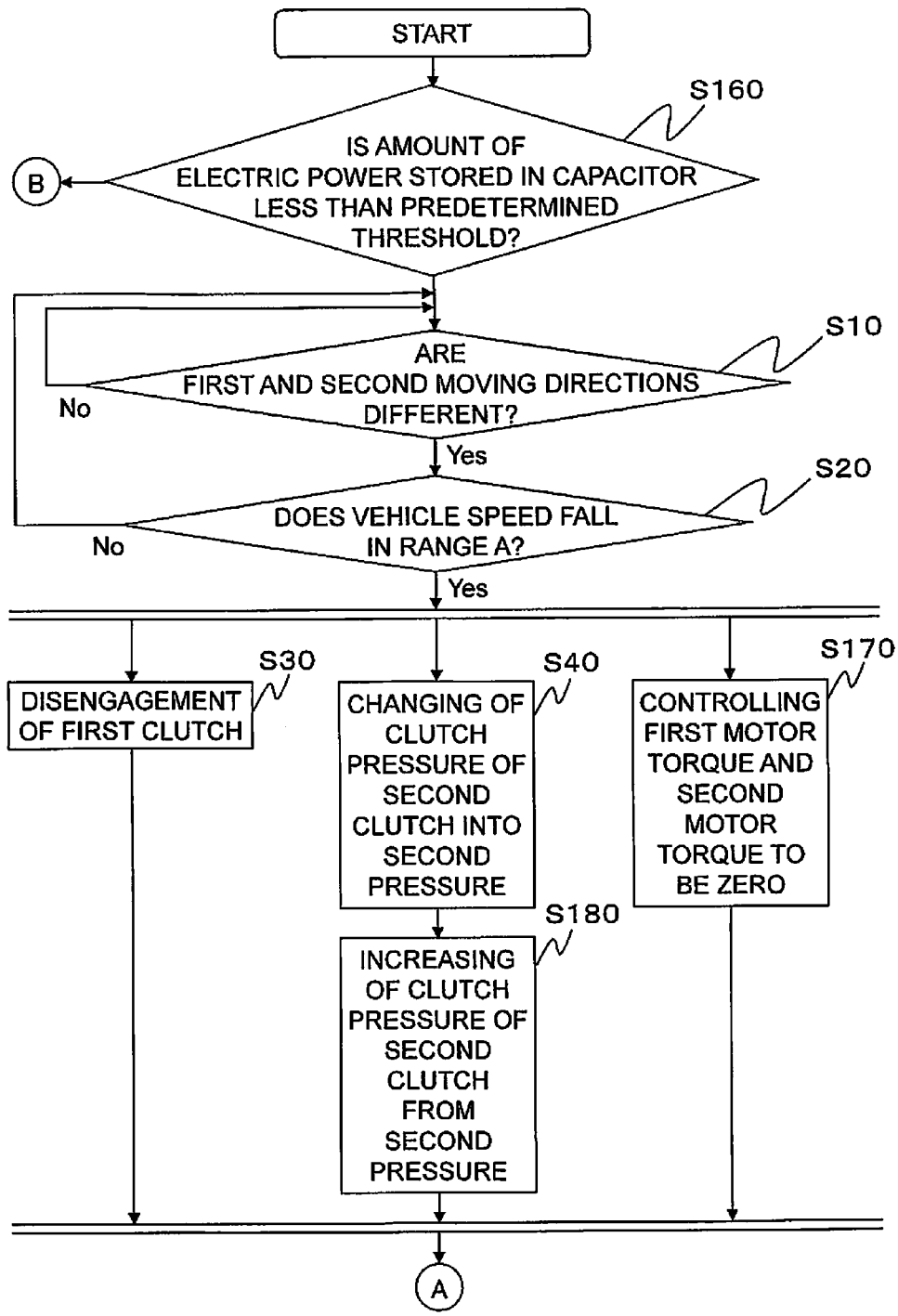
FIG. 10A is a flowchart showing a schematic action of the power transmission in a third practical example.
Figure 10B:
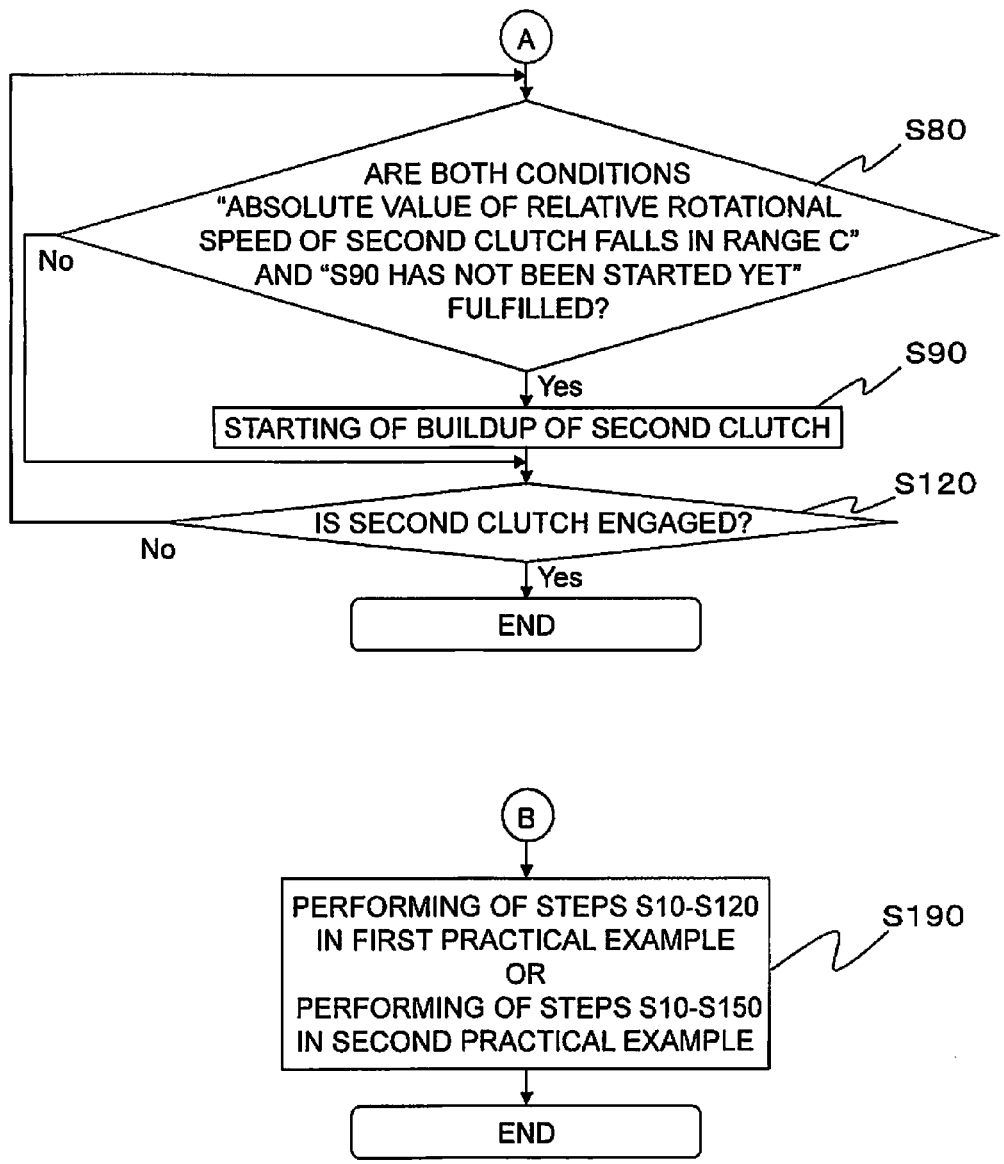
FIG. 10B is a flowchart showing the schematic action of the power transmission in the third practical example.

The present practical example explains a case of reducing the relative speed of the clutch without consuming power as much as possible when the amount of electricity changed in the capacitor 64 of the work vehicle 1 is small. FIGS. 10A and 10B are flowcharts showing a schematic action of the power transmission 24 in the third practical example. In FIGS. 10A and 10B, the same reference signs are assigned to the same processing as those in the first practical example, and the detailed explanation thereof will not be described. FIGS. 11A to 11E are charts for explaining the third practical example and correspond to FIGS. 6A to 6E. It should be noted that for easy comparison with the first practical example, values of the first practical example, which are different from those of the third practical example, are depicted with fine lines in some charts of FIGS. 11A to 11E. Additionally in FIGS. 11A to 11E, the same reference signs are assigned to things that mean the same contents as those in the first practical example. The schematic action of the power transmission 24 in the third practical example will be hereinafter explained by mainly focusing on differences from the first practical example.

Figure 11:
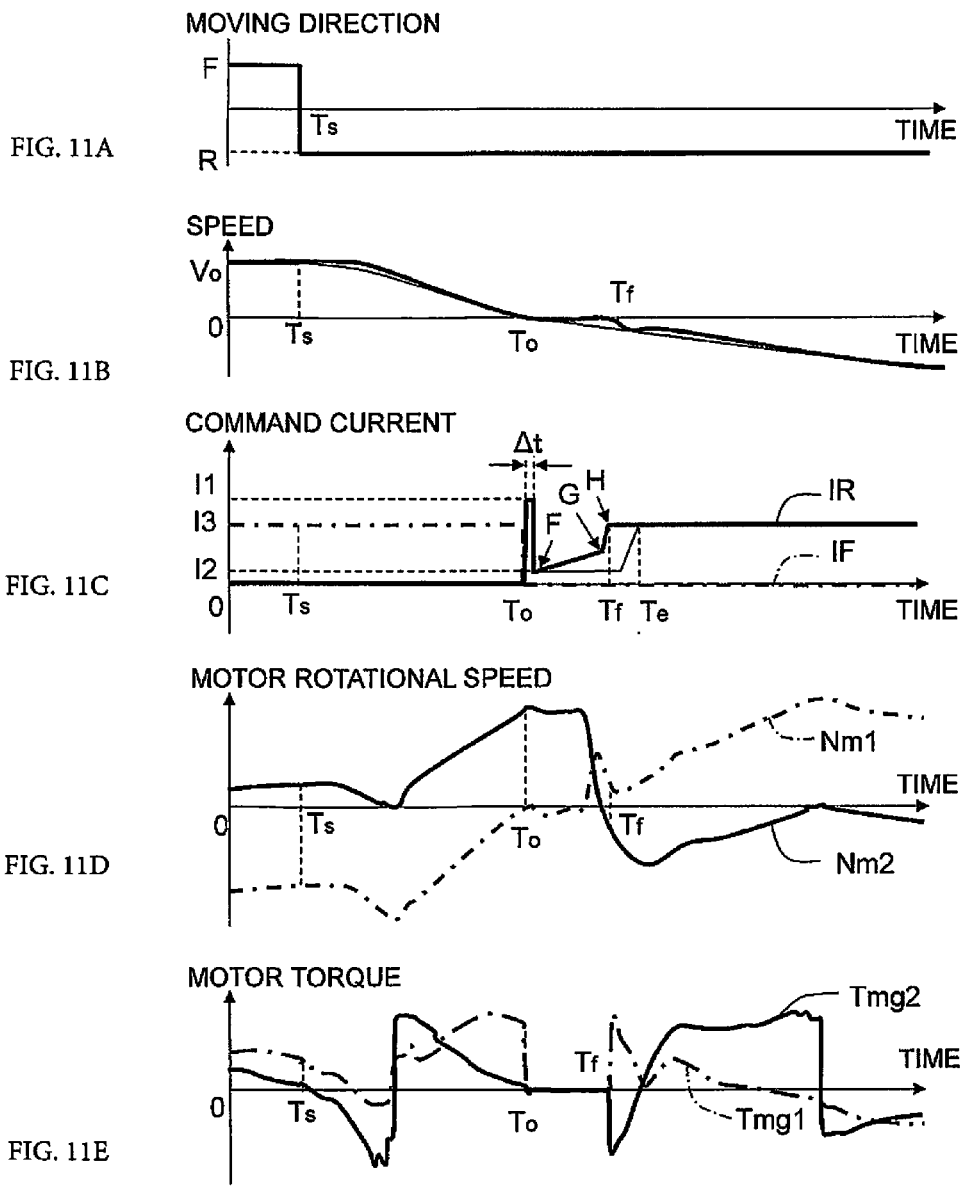
FIGS. 11A-11E show exemplary time-series variations in a variety of parameters of the work vehicle in the third practical example.

As shown in FIGS. 11A and 11B, in the third practical example, it is similarly assumed that the moving direction to be instructed is switched from "F" to "R" at Time Ts and the vehicle speed becomes 0 at Time To. In the present practical example, the control unit 27 firstly determines whether or not the amount of electric power stored in the capacitor 64 is less than a predetermined threshold (Step S160). When the amount of electric power stored in the capacitor 64 is equal to or greater than the predetermined threshold (No in Step S160), either Steps S10 to S120 in the first practical example or Steps S10 to S150 in the second practical example will performed (Step S190 in FIG. 10B). When the amount of electric power stored in the capacitor 64 is less than the predetermined threshold (Yes in Step S160), the processing in and after Step S10 will be performed.

In Step S30, as shown in FIG. 11C, the clutch controlling unit 58 disengages the first clutch (CF) at Time To. Then in Step S40, the clutch controlling unit 58 increases the clutch pressure of the second clutch (CR) to the second pressure (the fill pressure) (Step S40). It should be noted that FIG. 11C shows a situation that the clutch pressure of the second clutch (CR) becomes the second pressure (the fill pressure) at Time To+Δt, but the clutch pressure of the second clutch (CR) may become the second pressure either in a period from Time To to Time To+Δt or after Time To+Δt. Additionally, as shown in FIG. 11E, the motor controlling unit 55 controls the torque of the first motor MG1 and that of the second motor MG2 to be substantially zero at Time To, i.e., when the vehicle speed falls in the range A (Step S170).

After Step S40, the clutch pressure of the second clutch is increased from the second pressure (the fill pressure) so as to make the relative rotational speed of the second clutch (CR) approach 0 by the driving force of the engine (Step S180).

However, as shown in FIG. 11E, the torque of the first motor MG1 is kept 0, and thus, the vehicle does not accelerate till finish of clutch synchronization. Therefore, as shown in FIG. 11B, after the vehicle speed becomes 0 at Time To, the vehicle inevitably stops till around Time Tf. However, at and after Time Tf, the second clutch CR is engaged, and thus, driving in the rearward moving direction is achieved.

Figure 12:
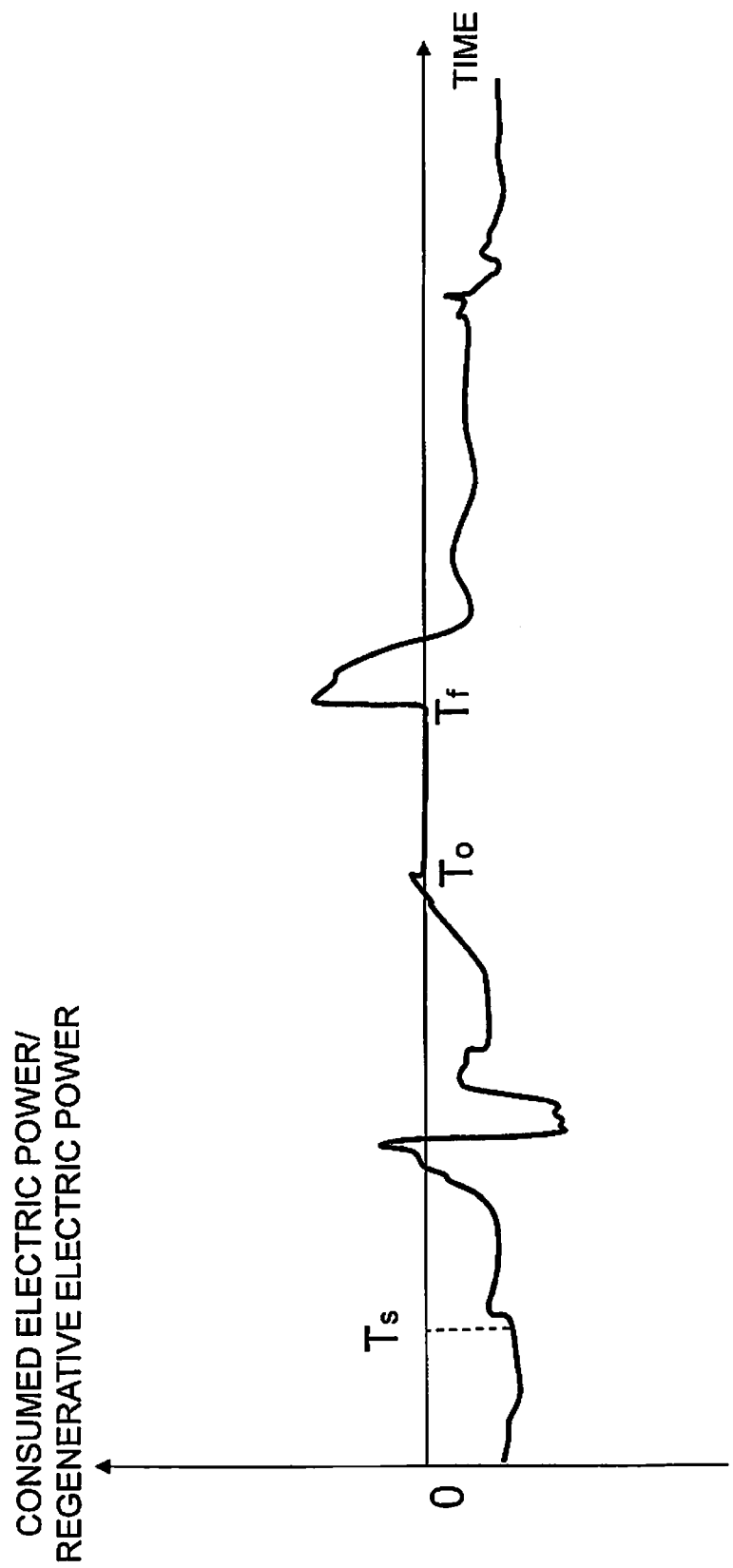
FIG. 12 shows time-series variation in consumed electric power/regenerative electric power by all motors in the third practical example.
Figure 13:
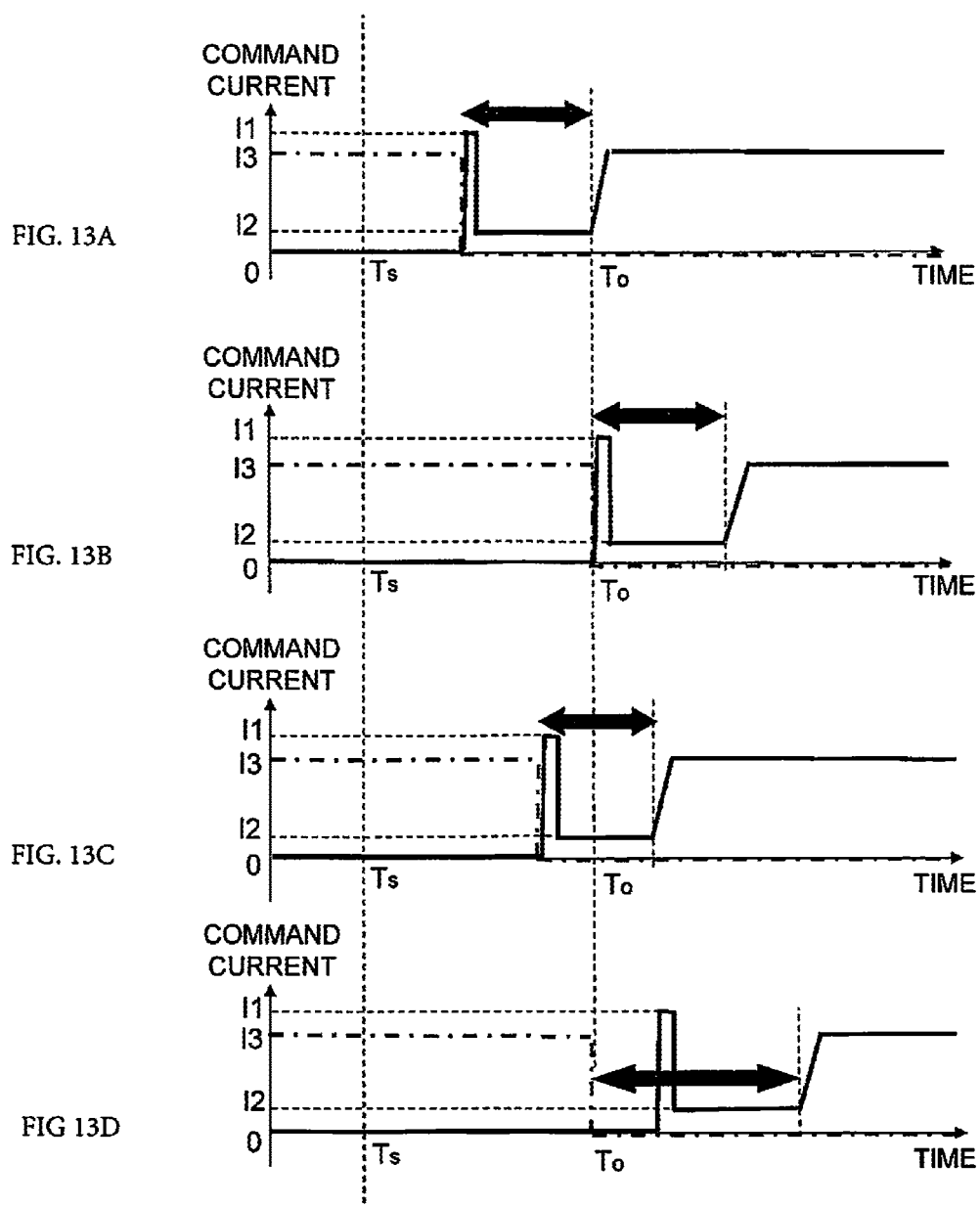
FIGS. 13A-13D show modifications of time-series variations in a command signal to be transmitted to each clutch control valve from a clutch controlling unit

Next, effects peculiar to the present practical example will be explained. In the third practical example, driving force of the motor is not utilized at all for synchronization between the clutch input shaft and the clutch output shaft of the second clutch (CR). Therefore, in terms of consumed electric power/regenerative electric power, the third practical example has the following features. FIG. 12 shows time-series variation in consumed electric power/regenerative electric power by all the motors in the third practical example. As is obvious from indication of FIG. 12, the motors do not consume electric power in a clutch synchronization period from Time To to Tune Tf. Therefore, even when the amount of electricity stored in the capacitor 64 is small, clutch switching can be achieved.

Remarks of First to Third Practical Examples

The aforementioned practical examples have been explained by exemplifying the schematic action of the power transmission 24 in switching the moving direction of the work vehicle 1 from the forward moving direction to the rearward moving direction through the operation of the FR operating device 54 by the operator. However, the aforementioned schematic action can be applied even to switching the moving direction of the work vehicle 1 from the rearward moving direction to the forward moving direction. The following explanation relates to differences from the aforementioned practical examples in switching the moving direction of the work vehicle 1 from the rearward moving direction to the forward moving direction. It should be noted that in this configuration, the clutch CR is handled as the first clutch, whereas the clutch CF is handled as the second clutch.

In switching the moving direction of the work vehicle 1 from the rearward moving direction to the forward moving direction, values vary so as to be line-symmetric with respect to the time axis in FIGS. 6A to 6F, FIGS. 8A to 8F and FIGS. 11A to 11E, except for the values of command current of the clutch indicated in FIGS. 6C, 8C and 11C and the absolute values of the clutch relative rotation indicated in FIGS. 6F and 8F. Therefore, the range E in Step S130 in the second practical example becomes [−Nth4, 0] (−Nth4 means a value having an opposite sign to Nth4 in the second practical example).

Additionally, the aforementioned practical examples have explained the situation that the first clutch is disengaged at the timing when the speed becomes around 0. However, the first clutch may be disengaged earlier than the timing. Specifically, when the moving direction of the work vehicle 1 is switched from the forward moving direction to the rearward moving direction, the range A in Step S20 in FIGS. 5A, 7A and 10A may be set as [0, vth] (it should be noted that vth is a threshold of the vehicle speed and has a positive value). When the moving direction of the work vehicle 1 is switched from the rearward moving direction to the forward moving direction, the range A may be set as [−vth, 0]. In other words, where the vehicle speed of the work vehicle 1 is set as positive in moving in the pre-switching moving direction, a range that the vehicle speed becomes a predetermined value or less may be defined as the range A.

Additionally in the second practical example, the determination processing of Step S130 is performed on the basis of both of the rotational speed Nm2 of the second motor MG2 and the accelerator operating amount Ac. However, the clutch controlling unit 58 may only determine whether or not the motor rotational speed falls in the range E. Then, when the rotational speed Nm2 of the second motor MG2 falls in the range E (Yes in Step S130), the processing of Step S140 may be performed. Alternatively, instead of the above, the clutch controlling unit 58 may determine whether or not the absolute value |Nrout−Nin| of the relative rotational speed of the second clutch (CR) falls in a range G. The range G is [0, Nth0] (Nth0 is a threshold of the relative rotational speed of the rearward movement clutch CR; see FIG. 8F). In other words, in Step S130, the clutch controlling unit 58 may determine whether or not the relative rotational speed (Nrout−Nin) of the second clutch CR falls in a preliminarily set range G' [−Nth0, Nth0].

Additionally in Step S130, the clutch controlling unit 58 and the motor controlling unit 55 may perform the determination processing on the basis of both of the relative rotational speed (Nrout−Nin) of the second clutch CR and the accelerator operating amount Ac. In other words, the clutch controlling unit 58 and the motor controlling unit 55 may determine whether or not the absolute value |Nrout−Nin| of the relative rotational speed of the second clutch (CR) falls in the range G, and simultaneously, whether or not the accelerator operating amount Ac falls in the range F. Alternatively, the clutch controlling unit 58 and the motor controlling unit 55 may determine whether or not the relative rotational speed (Nrout−Nin) of the second clutch CR falls in the preliminarily set range G', and simultaneously, whether or not the accelerator operating amount Ac falls in the range F.

Additionally, the first and second practical examples have explained that the processing of Step S40 is performed after Step S20. However, the processing of Step S40 may be performed at different timing from the above. For example, in the first practical example, when the result of the determination processing of Step S60 is Yes, the processing of Step S40 may be performed immediately after Step S60. On the other hand, in the second practical example, when the result of the determination processing of Step S130 is Yes, the processing of Step S40 may be performed immediately after Step S130. Contrarily, the processing of Step S40 may be performed before Step S20.

Based on the above, in consideration of the timing for disengaging the first clutch, disengagement of the first clutch and engagement of the second clutch can be assumed to be performed in patterns shown in FIGS. 13A-13D other than the patterns in the first and second practical examples. FIGS. 13A-13D include charts showing a modification of time-series variations in command signal to be transmitted to the respective clutch control valves from the clutch controlling unit. In FIGS. 13A-13D, a dashed dotted line indicates a command signal to be transmitted to the first clutch, whereas a solid line indicates a command signal to be transmitted to the second clutch. Additionally, a double headed arrow in each of the patterns in FIGS. 13A-13D indicates a period in which either Step S50 in the first practical example or Step S51 in the second practical example is being performed. According to this, the pattern in FIG. 13A indicates a situation that before Time To at which the vehicle speed becomes 0, the clutch controlling unit 58 disengages the first clutch and changes the clutch pressure of the second clutch to start buildup of the second clutch at Time To, and simultaneously, the motor controlling unit 55 starts performing processing of reducing the relative rotational speed of the second clutch. The pattern in FIG. 13B indicates a situation that at Time To at which the vehicle speed becomes 0, the clutch controlling unit 58 disengages the first clutch and the motor controlling unit 55 starts performing processing of reducing the relative rotational speed of the second clutch, whereby modulation of the second clutch is started from Time To. Buildup of the second clutch is performed at a point of time when the relative rotational speed of the second clutch falls in the range C. The pattern in FIG. 13C indicates a situation that slightly before Time To at which the vehicle speed becomes 0, the clutch controlling unit 58 disengages the first clutch and the motor controlling unit 55 starts performing processing of reducing the relative rotational speed of the second clutch, whereby buildup of the second clutch is started in a short time after Time To at which the vehicle speed becomes 0. Buildup of the second clutch is performed at a point of time when the relative rotational speed of the second clutch falls in the range C. The pattern in FIG. 13D indicates a situation that at Time To at which the vehicle speed becomes 0, the clutch controlling unit 58 disengages the first clutch and the motor controlling unit 55 starts performing processing of reducing the relative rotational speed of the second clutch, whereby modulation of the second clutch is started at delayed timing. In the present exemplary embodiment, the control unit 27 may perform processing with these four patterns other than the patterns described in the first and second practical examples.

Features

The work vehicle 1 according to the present exemplary embodiment has the following features.

The control unit 27 of the work vehicle 1 includes the clutch controlling unit 58 and the motor controlling unit 55. The clutch controlling unit 58 is configured to disengage the first clutch in the condition that the first clutch is engaged and the second clutch is disengaged, when the first moving direction inputted through the FR operating device 54 as an instruction of the operator and the second moving direction determined based on the vehicle speed detected by the output rotational speed detecting unit 37 are different from each other, and in addition, when the vehicle speed falls in the preliminarily set range A. Furthermore, the motor controlling unit 55 is configured to control the second motor MG2 so as to reduce the relative rotational speed of the second clutch after the first clutch is disengaged.

With the configuration, the braking force is absorbed by the engine that the first clutch is engaged until the vehicle speed is reduced to some extent. Thus, the work vehicle 1 can exert braking performance equivalent to that of a conventional torque converter type work vehicle.

The clutch controlling unit 58 is configured to change the clutch pressure of the second clutch into the predetermined second pressure (the fill pressure), which is lower than the first pressure at which the second clutch is engaged, when the vehicle speed falls in the range A. Therefore, engagement of the second clutch can be quickly started.

The clutch controlling unit 58 is capable of starting buildup of the second clutch when the absolute value of the relative rotational speed of the second clutch falls in the range C (that is when the relative rotational speed of the second clutch falls in the range C'). Therefore, buildup of the second clutch is started after the relative rotational speed of the second clutch becomes sufficiently low. Hence, the thermal load of the second clutch is reduced. As a result, abrasion of the clutch plates can be reduced. Likewise, vibration of the vehicle body can be alleviated in contact of the second clutch. In addition to the above, the force of inertia of the power transmission 24 can be prevented from acutely acting on the engine, and thus, the load of the engine 21 can be also reduced.

The power transmission 24 can be designed to further include the second motor rotational speed detecting unit 76 configured to detect the rotational speed of the second motor MG2. Additionally, the clutch controlling unit 58 is capable of changing the clutch pressure of the second clutch into the third pressure (the assist pressure), which is higher than the second pressure (the fill pressure) and is lower than the first pressure (the pressure for keeping the clutch in the engaged state), when the rotational speed of the motor falls in the preliminarily set range E. With the configuration, the relative rotational speed of the second clutch is reduced with additional use of torque transmission by the friction force of the second clutch. Thus, even when the consumed electric power of the motor is reduced by reducing the synchronization torque of the motor, the relative rotational speed of the second clutch can be reduced in a period of time equivalent to that required when such reduction is not performed. Acceleration performance can be enhanced by using the reduced amount of consumed electric power for acceleration of the vehicle body. Furthermore, the cycle time of a repetitive work is reduced, and thus, the work amount per unit time of the work vehicle 1 can be enhanced.

Moreover, based on motor rotation, synchronized assistance is enabled at the timing when motor action is changed from electric power generation to electric power discharge, and discharge electric power can be reduced while regenerative electric power can be reliably obtained.

The power transmission 24 can be designed to further include the second motor rotational speed detecting unit 76 configured to detect the rotational speed of the second motor MG2. Additionally, the clutch controlling unit 58 is capable of changing the clutch pressure of the second clutch into the third pressure (the assist pressure), which is higher than the second pressure (the fill pressure) and is lower than the first pressure (the pressure for keeping the clutch in the engaged state), when the relative rotational speed of the second clutch falls in the preliminarily set range G. With the configuration, the relative rotational speed of the second clutch is reduced with additional use of torque transmission by the friction force of the second clutch. Thus, even when the consumed electric power of the motor is reduced by reducing the synchronization torque of the motor, the relative rotational speed of the second clutch can be reduced in a period of time equivalent to that required when such reduction is not performed. Acceleration performance can be enhanced by using the reduced amount of consumed electric power for acceleration of the vehicle body. Furthermore, the cycle time of a repetitive work is reduced, and thus, the work amount per unit time of the work vehicle 1 can be enhanced.

Moreover, based on the relative rotational speed of the second clutch, clutch load attributed to synchronized assistance and abrasion can be inhibited.

The work vehicle 1 can be designed to further include the accelerator operating member 51a and the accelerator operation detecting unit 51b configured to detect the operating amount of the accelerator operating member 51a. Additionally, the clutch controlling unit 58 is capable of changing the clutch pressure of the second clutch into the third pressure (the assist pressure), which is higher than the second pressure (the fill pressure) and is lower than the first pressure (the pressure for keeping the clutch in the engaged state), when the operating amount of the accelerator operating member 51a falls in the preliminarily set range F. By thus adding the accelerator condition to the conditions for performing synchronized assistance, synchronized assistance can be configured not to be performed when vibration of the vehicle body attributed to synchronized assistance is relatively greater than the acceleration force of the vehicle body attributed to pressing-down of the accelerator pedal.

The motor controlling unit 55 is capable of controlling the torque of the motor through the control of reducing the relative rotational speed of the second clutch by setting the torque limit that is the absolute value of the maximum torque allowed to be outputted from the motor. With the configuration, the motor controlling unit 55 can inhibit acute variation in motor rotation, thereby can prevent damage or breakage of movable parts such as bearings due to shortage of oil film formation or so forth. Furthermore, excessive consumption of electric power by the motor can be prevented.

The motor controlling unit 55 is capable of increase the torque limit from the predetermined initial value Tlim0 to the maximum value Tmax. With the configuration, variation in rotational acceleration of the motor can be inhibited. Thus, it is possible to prevent occurrence of vibration of the work vehicle 1 attributed to transference of the force of inertia to the vehicle body through the planet gears.

The motor controlling unit 55 is capable of increasing the torque limit from the predetermined initial value Tlim0 to the maximum value Tmax till Time Tds at which the absolute value of the relative rotational speed of the second clutch falls in the preliminarily set range B, and is capable of reducing the torque limit to the predetermined target value Tg at and after Time Tds. With the configuration, electric power to be consumed by the motor can be reduced by inhibiting the motor torque when the clutch pressure of the second clutch increases due to starting of buildup of the second clutch and the clutch relative rotational speed is lowered by torque transmission of the second clutch. Moreover, it is possible to prevent vibration of the work vehicle 1 attributed to transference of variation in motor torque.

The motor controlling unit 55 is capable of controlling the torque of the motor to be substantially zero at and after Time Tce when the absolute value of the relative rotational speed of the second clutch falls in the preliminarily set range D. With the configuration, a torque from the motor is not received when the clutch pressure of the second clutch is high immediately before the end of buildup of the second clutch. Hence, vibration of the work vehicle 1 under modulation can be further prevented.

The power transmission 24 can be designed to further include the capacitor 64 for storing electric power generated by the motor. Additionally, when the amount of electricity stored in the capacitor 64 becomes smaller than a predetermined amount, the clutch controlling unit 58 is capable of increasing the clutch pressure of the second clutch from the second pressure (the fill pressure) after the clutch pressure of the second clutch becomes the second pressure (the fill pressure). With the configuration, the clutch input shaft and the clutch output shaft of the second clutch (CR) are synchronized only by the driving force of the engine 21 almost without utilizing the driving force of the motor. Therefore, even when the amount of electricity stored in the capacitor 64 is small, clutch switching can be carried out.

The expression "within the range A" may refer to the vehicle speed 0. In this case, disengagement of the first clutch can be delayed until the vehicle stops and then starts moving in the opposite direction. Therefore, even when an operator frequently operates the FR operating device 54, the frequency of actual clutch switching can be reduced. Additionally, deceleration is also enabled with both of the first motor and the second motor. Hence, the driving force is increased for the first moving direction inputted through the FR operating device 54 as an instruction of the operator. Therefore, the work vehicle 1 can perform a shuttle action even on a slope such as a hill.

The expression "within the range A" may refer to a range in which the vehicle speed to be detected by the output rotational speed detecting unit 37 becomes a predetermined value or less, where the vehicle speed of the work vehicle moving in the second moving direction is defined as positive. In the configuration, the first clutch is quickly disengaged. Hence, the relative rotational speed of the second clutch becomes sufficiently low, and the second clutch is quickly engaged. Accordingly, power of the engine 21 is quickly supplied to the vehicle that accelerates in the aforementioned first moving direction. As a result, the vehicle quickly accelerates in the first moving direction. When quickly accelerating, the vehicle is reduced in cycle time. Hence, the vehicle can be enhanced in work efficiency.

Modifications

Exemplary embodiments of the present invention have been explained. However, the present invention is not limited to the aforementioned exemplary embodiments, and a variety of changes can be made without departing from the scope of the present invention.

The present invention is not limited to the aforementioned wheel loader, and may be applied to another type of work vehicle, such as a bulldozer, a tractor, a forklift or a motor grader.

The application target of the present invention is not limited to the EMT and may be another type of transmission, such as the HMT. In this case, the first motor MG1 functions as a hydraulic motor and a hydraulic pump. Likewise, the second motor MG2 functions as a hydraulic motor and a hydraulic pump. The first motor MG1 and the second motor MG2 are variable displacement pumps/motors, and displacements thereof are configured to be controlled when the tilt angles of the swashplates or the tilting shafts thereof are controlled by the control unit 27.

Before the clutch pressure of the aforementioned clutch CF, CR is regulated to the second pressure (the fill pressure), a temporarily high command current indicated in FIG. 6C and so forth (a command current in a period indicated with Δt in FIG. 6C) may not be outputted to the clutch control valve VF, VR. For example, the clutch pressure of the clutch CF, CR may be regulated to the second pressure (the fill pressure) by outputting the command current I2 to the clutch control valve VF, VR from an early stage in Step S40.

Additionally, the clutches CF and CR are not limited to the aforementioned clutches to be controlled by the hydraulic pressure, and may be electromagnetic clutches or so forth. Regardless of the type of clutches, a torque is not transmitted in a preparatory action, an action for reducing a period of time required for a clutch engaging action after the preparatory action is performed in the preparatory action. When a type of clutches, enabling clutch engaging instantly or in a quite short period of time without performing the preparatory action, are used as the clutches CF and CR, the aforementioned processing of Step S40 may be omitted.

The present invention may relate to the work vehicle 1 configured not to implement the second practical example. In this case, the clutch controlling unit 58 and the motor controlling unit 55 may be configured not to receive the rotational speed Nm2 of the second motor MG2 to be outputted by the second motor rotational speed detecting unit 76 and the accelerator operating amount Ac to be outputted by the accelerator operation detecting unit 51b. Additionally, among the constituent elements shown in FIGS. 1 to 3, those not necessarily used in any of the first to third practical examples can be omitted from the work vehicle 1.

Moreover, in the aforementioned exemplary embodiment, the motor controlling unit 55 has been explained by mainly focusing on the torque control of the second motor MG2. However, the motor controlling unit 55 may be configured to control either the first motor MG1 or both of the first motor MG1 and the second motor MG2 so as to reduce the relative rotational speed of the second clutch.

Figure 14:
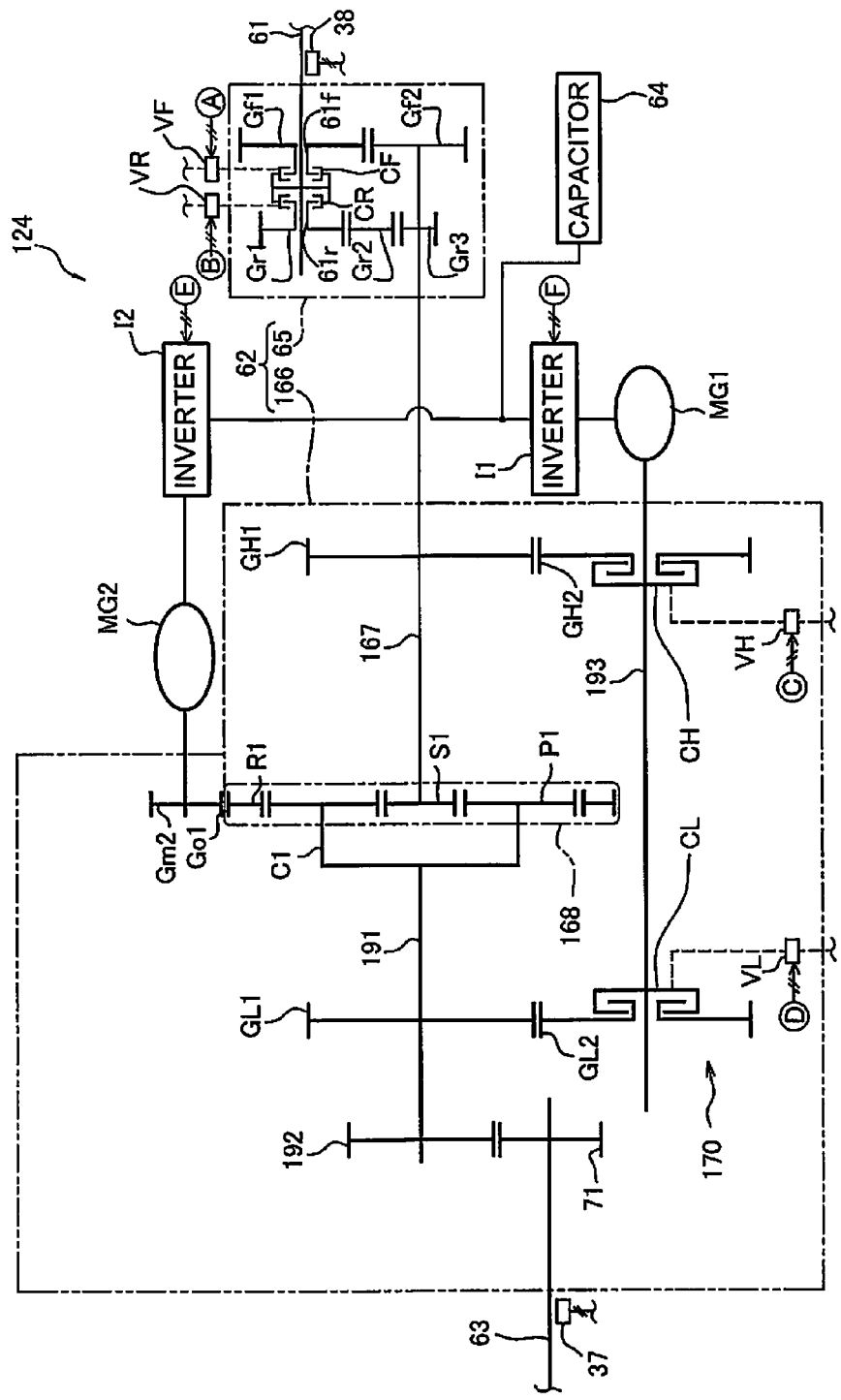
FIG. 14 is a schematic diagram showing a construction of a power transmission in a modification.

The aforementioned power transmission 24 includes the first planetary gear mechanism 68 and the second planetary gear mechanism 69. However, the number of the planetary gear mechanisms provided for the power transmission is not limited to two. The power transmission may be provided with only one planetary gear mechanism. Alternatively, the power transmission may be provided with three or more planetary gear mechanisms. FIG. 14 is a schematic diagram of a construction of a modification of a power transmission 124. Constituent elements of the work vehicle, except for those shown in FIG. 14, are similar to those of the work vehicle 1 according to the aforementioned exemplary embodiment, and hence, the detailed explanation thereof will not be described. Additionally in FIG. 14, the same reference signs are assigned to the same constituent elements as those of the power transmission 24 according to the aforementioned exemplary embodiment.

As shown in FIG. 14, the power transmission 124 includes a gearshift mechanism 166. The gearshift mechanism 166 includes a planetary gear mechanism 168, a first transmission shaft 167, a second transmission shaft 191 and a second transmission shaft gear 192. The first transmission shaft 167 is coupled to the FR switch mechanism 65. The planetary gear mechanism 168 and the second transmission shaft gear 192 are disposed coaxially to the first transmission shaft 167 and the second transmission shaft 191.

The planetary gear mechanism 168 includes a sun gear S1, a plurality of planet gears P1, a carrier C1 supporting the plural planet gears P1, and a ring gear R1. The sun gear S1 is coupled to the first transmission shaft 167. The plural planet gears P1 are meshed with the sun gear S1, and are rotatably supported by the carrier C1. The carrier C1 is fixed to the second transmission shaft 191. The ring gear R1 is meshed with the plural planet gears P1 and is rotatable. Additionally, the ring outer peripheral gear Go1 is provided on the outer periphery of the ring gear R1. The second motor gear Gm2 is fixed to the output shaft of the second motor MG2, and is meshed with the ring outer peripheral gear Go1.

The second transmission shaft gear 192 is coupled to the second transmission shaft 191. The second transmission shaft gear 192 is meshed with the output gear 71, and the rotation of the second transmission shaft gear 192 is outputted to the output shaft 63 through the output gear 71.

The gearshift mechanism 166 includes a first high speed gear (hereinafter referred to as "a first H gear GH1"), a second high speed gear (hereinafter referred to as "a second H gear GH2"), a first low speed gear (hereinafter referred to as "a first L gear GL1"), a second low speed gear (hereinafter referred to as "a second L gear GL2"), a third transmission shaft 193 and a Hi/Lo switch mechanism 170.

The first H gear GH1 and the first L gear GL1 are disposed coaxially to the first transmission shaft 167 and the second transmission shaft 191. The first H gear GH1 is coupled to the first transmission shaft 167. The first L gear GL1 is coupled to the second transmission shaft 191. The second H gear GH2 is meshed with the first H gear GH1. The second L gear GL2 is meshed with the first L gear GL1. The second H gear GH2 and the second L gear GL2 are disposed coaxially to the third transmission shaft 193, and is disposed to be rotatable with respect to the third transmission shaft 193. The third transmission shaft 193 is coupled to the output shaft of the first motor MG1.

The Hi/Lo switch mechanism 170 is a mechanism for switching the driving force transmission path in the power transmission 24 between the high speed mode (the Hi mode) in which the vehicle speed is high and the low speed mode (the Lo mode) in which the vehicle speed is low. The Hi/Lo switch mechanism 170 includes the H clutch CH configured to be engaged in the Hi mode and the L clutch CL configured to be engaged in the Lo mode. The H clutch CH is configured to engage/disengage the second H gear GH2 and the third transmission shaft 193. On the other hand, the L clutch CL is configured to engage/disengage the second L gear GL2 and the third transmission shaft 193.

In the present modification, as with the aforementioned exemplary embodiment, the rotational speed of the clutch output shaft of each clutch CF, CR may be similarly configured to be calculated based on the rotational speed of the first motor MG1 and that of the second motor MG2, or alternatively, may be configured to be directly detected by a rotational speed detecting unit mounted to the clutch output shaft of each clutch CF, CR. The control of the power transmission 124 in the work vehicle according to the present modification is similar to that of the power transmission 24 according to the aforementioned exemplary embodiment.

According to exemplary embodiments of the present invention, it is possible to provide a work vehicle and a method of controlling the work vehicle, whereby when an operator switches between forward movement and rearward movement in a power transmission of an HMT or EMT type, over-rotation of a gear mechanism in the power transmission can be prevented and engine load and clutch abrasion can be reduced.

The invention claimed is:

1. A work vehicle, comprising:
an engine;
a hydraulic pump configured to be driven by the engine;
a work implement configured to be driven by a hydraulic oil discharged from the hydraulic pump;
a travelling apparatus configured to be driven by the engine;
a power transmission configured to transmit a driving force transmitted thereto from the engine to the travelling apparatus;
a control unit configured to control the power transmission;
a forward/rearward movement switch operating device into which an instruction regarding either forward movement or rearward movement is inputted by an operator; and
a vehicle speed detecting unit configured to detect a vehicle speed of the travelling apparatus,
the power transmission including
an input shaft;
an output shaft;
a gear mechanism having a planetary gear mechanism, the gear mechanism being configured to transmit a rotation of the input shaft to the output shaft;
a motor connected to a rotary element of the planetary gear mechanism;
a first clutch for connecting with the gear mechanism to drive the travelling apparatus in one of a forward moving direction and a rearward moving direction;
a second clutch for connecting with the gear mechanism to drive the travelling apparatus in an opposite direction to the one direction; and
a second clutch relative rotational speed detecting unit configured to detect a relative rotational speed between a clutch input shaft and a clutch output shaft in the second clutch,
the power transmission being configured to change a rotational speed ratio of the output shaft to the input shaft by changing a rotational speed of the motor,
the control unit including
a clutch controlling unit configured to disengage the first clutch in a condition that the first clutch is engaged and the second clutch is disengaged when a first moving direction inputted through the forward/rearward switch operating device as the instruction of the operator and a second moving direction determined based on the vehicle speed detected by the vehicle speed detecting unit are different from each other and when the vehicle speed falls in a preliminarily set first range, and
a motor controlling unit configured to control the motor to reduce the relative rotational speed of the second clutch after the first clutch is disengaged.

2. The work vehicle according to claim 1, wherein the clutch controlling unit is configured to change a clutch pressure of the second clutch into a predetermined second pressure when the vehicle speed falls in the first range, the second pressure being lower than a first pressure at which the second clutch is engaged.

3. The work vehicle according to claim 2, wherein the clutch controlling unit is configured to increase the clutch pressure of the second clutch from the second pressure when the relative rotational speed of the second clutch falls in a preliminarily set second range.

4. The work vehicle according to claim 3, wherein the power transmission further includes a motor rotational speed detecting unit configured to detect a rotational speed of the motor, and
the clutch controlling unit is configured to change the clutch pressure of the second clutch into a third pressure when the rotational speed of the motor falls in a preliminarily set third range, the third pressure being higher than the second pressure and being lower than the first pressure.

5. The work vehicle according to claim 3, wherein the clutch controlling unit is configured to change the clutch pressure of the second clutch into a third pressure when the relative rotational speed of the second clutch falls in a preliminarily set fourth range, the third pressure being higher than the second pressure and being lower than the first pressure.

6. The work vehicle according to claim 4, further comprising
an accelerator operating member; and
an accelerator operation detecting unit configured to detect an operating amount of the accelerator operating member,
the clutch controlling unit configured to change the clutch pressure of the second clutch into the third pressure when the operating amount of the accelerator operating member falls in a preliminarily set fifth range.

7. The work vehicle according to claim 1, wherein the motor controlling unit is configured to control a torque of the motor by setting a torque limit, the torque limit being an absolute value of a maximum torque allowed to be outputted from the motor, and
the motor controlling unit is configured to increase the torque limit from a predetermined initial value to a predetermined maximum value.

8. The work vehicle according to claim 7, wherein the motor controlling unit is configured to
increase the torque limit from the initial value to the maximum value until the relative rotational speed of the second clutch falls in a preliminarily set sixth range, and
reduce the torque limit to a predetermined first target value when the relative rotational speed of the second clutch falls in the sixth range.

9. The work vehicle according to claim 8, wherein the motor controlling unit is configured to control the torque of the motor to be zero when the relative rotational speed of the second clutch falls in a preliminarily set seventh range.

10. The work vehicle according to claim 1, wherein the vehicle speed of the work vehicle moving in the second moving direction is defined as positive, the first range being a range in which the vehicle speed becomes a predetermined value or less.

11. A method of controlling a work vehicle, wherein the work vehicle includes an engine, a hydraulic pump configured to be driven by the engine, a work implement configured to be driven by an hydraulic oil discharged from the hydraulic pump, a travelling apparatus configured to be driven by the engine, a power transmission configured to transmit a driving force transmitted thereto from the engine to the travelling apparatus, and a forward/rearward movement switch operating device into which an instruction regarding either forward movement or rearward movement is inputted by an operator, the power transmission includes an input shaft, an output shaft, a gear mechanism having a planetary gear mechanism and configured to transmit a rotation of the input shaft to the output shaft, a motor connected to a rotary element of the planetary gear mechanism, a first clutch for connecting with the gear mechanism to drive the travelling apparatus in one of a forward moving direction and a rearward moving direction, and a second clutch for connecting with the gear mechanism to drive the travelling apparatus in an opposite direction to the one direction, the power transmission is configured to change a rotational speed ratio of the output shaft to the input shaft by changing a rotational speed of the motor, and the method comprises the steps of disengaging the first clutch in a condition that the first clutch is engaged and the second clutch is disengaged when a first moving direction inputted through the forward/rearward switch operating device as the instruction of the operator and a second moving direction determined based on a vehicle speed of the travelling apparatus are different from each other and when the vehicle speed falls in a preliminarily set first range, and controlling the motor to reduce a relative rotational speed between a clutch input shaft and a clutch output shaft in the second clutch after the first clutch is disengaged.

12. The work vehicle according to claim 5, further comprising an accelerator operating member; and an accelerator operation detecting unit configured to detect an operating amount of the accelerator operating member, the clutch controlling unit configured to change the clutch pressure of the second clutch into the third pressure when the operating amount of the accelerator operating member falls in a preliminarily set fifth range.

13. The work vehicle according to claim 12, wherein the motor controlling unit is configured to control a torque of the motor by setting a torque limit, the torque limit being an absolute value of a maximum torque allowed to be outputted from the motor, and the motor controlling unit is configured to increase the torque limit from a predetermined initial value to a predetermined maximum value.

14. The work vehicle according to claim 13, wherein the motor controlling unit is configured to increase the torque limit from the initial value to the maximum value until the relative rotational speed of the second clutch falls in a preliminarily set sixth range, and reduce the torque limit to a predetermined first target value when the relative rotational speed of the second clutch falls in the sixth range.

15. The work vehicle according to claim 14, wherein the motor controlling unit is configured to control the torque of the motor to be zero when the relative rotational speed of the second clutch falls in a preliminarily set seventh range.

16. The work vehicle according to claim 15, wherein the vehicle speed of the work vehicle moving in the second moving direction is defined as positive, the first range being a range in which the vehicle speed becomes a predetermined value or less.

* * * * *